US011483674B2

(12) United States Patent
 Kimishima

(10) Patent No.: US 11,483,674 B2
(45) Date of Patent: Oct. 25, 2022

(54) INFORMATION PROCESSING APPARATUS AND INFORMATION PROCESSING METHOD

(71) Applicant: SONY CORPORATION, Tokyo (JP)

(72) Inventor: Masato Kimishima, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/623,547

(22) PCT Filed: Jun. 21, 2018

(86) PCT No.: PCT/JP2018/023555
 § 371 (c)(1),
 (2) Date: Dec. 17, 2019

(87) PCT Pub. No.: WO2019/009083
 PCT Pub. Date: Jan. 10, 2019

(65) Prior Publication Data
 US 2020/0145788 A1 May 7, 2020

(30) Foreign Application Priority Data

Jul. 5, 2017 (JP) .............................. JP2017-132186

(51) Int. Cl.
 *H04W 4/029* (2018.01)
 *H04W 4/02* (2018.01)
 (Continued)

(52) U.S. Cl.
 CPC .......... *H04W 4/029* (2018.02); *H04W 4/026* (2013.01); *H04W 4/027* (2013.01); *G01S 19/49* (2013.01); *H04W 4/33* (2018.02)

(58) Field of Classification Search
 CPC ......... G01C 21/16; G01S 19/49; G01S 19/47; H04W 4/30; H04W 4/33; H04W 4/027; H04W 4/026; H04W 4/029; H04W 4/02
 See application file for complete search history.

(56) References Cited

U.S. PATENT DOCUMENTS

2007/0282553 A1* 12/2007 Fujimoto ............ B60R 21/0132
 702/104
2011/0106450 A1* 5/2011 Toda ....................... G01S 19/49
 701/472
(Continued)

FOREIGN PATENT DOCUMENTS

JP 2009-092666 A 4/2009
JP 2009-229295 A 10/2009
(Continued)

OTHER PUBLICATIONS

International Search Report and Written Opinion of PCT Application No. PCT/JP2018/023555, dated Aug. 14, 2018, 10 pages of ISRWO.

*Primary Examiner* — Jinsong Hu
*Assistant Examiner* — Farideh Madani
(74) *Attorney, Agent, or Firm* — Chip Law Group

(57) ABSTRACT

The present technology relates to an information processing apparatus and an information processing method that make it possible to properly report the reliability of information that is available with use of an inertial sensor. The information processing apparatus includes a state estimation section that estimates a state of a predetermined object and an output controller that controls, on the basis of the estimated state of the object, output of reliability information indicating the reliability of object information of the object, the object information of the object being available with use of an inertial sensor. The present technology is applicable to a portable information terminal such as a smartphone or a wearable device, for example.

15 Claims, 13 Drawing Sheets

(51) Int. Cl.
*H04W 4/33* (2018.01)
*G01S 19/49* (2010.01)

(56) References Cited

U.S. PATENT DOCUMENTS

| | | | |
|---|---|---|---|
| 2011/0307204 A1* | 12/2011 | Cho | B60T 8/172 |
| | | | 702/96 |
| 2012/0326922 A1* | 12/2012 | Yang | G01S 19/49 |
| | | | 342/357.3 |
| 2016/0089566 A1* | 3/2016 | Mitsunaga | G01P 1/00 |
| | | | 702/150 |
| 2017/0067741 A1* | 3/2017 | Tanabe | G01C 17/38 |
| 2017/0272900 A1* | 9/2017 | Do | H04W 4/02 |
| 2018/0176732 A1* | 6/2018 | Mikuriya | H04N 1/00307 |
| 2019/0274016 A1* | 9/2019 | Kuraoka | G08B 21/00 |

FOREIGN PATENT DOCUMENTS

| | | | | |
|---|---|---|---|---|
| JP | 2009229295 A | * | 10/2009 | G01C 21/00 |
| JP | 2009-300355 A | | 12/2009 | |
| JP | 2011-089922 A | | 5/2011 | |
| JP | 2013-210299 A | | 10/2013 | |

* cited by examiner

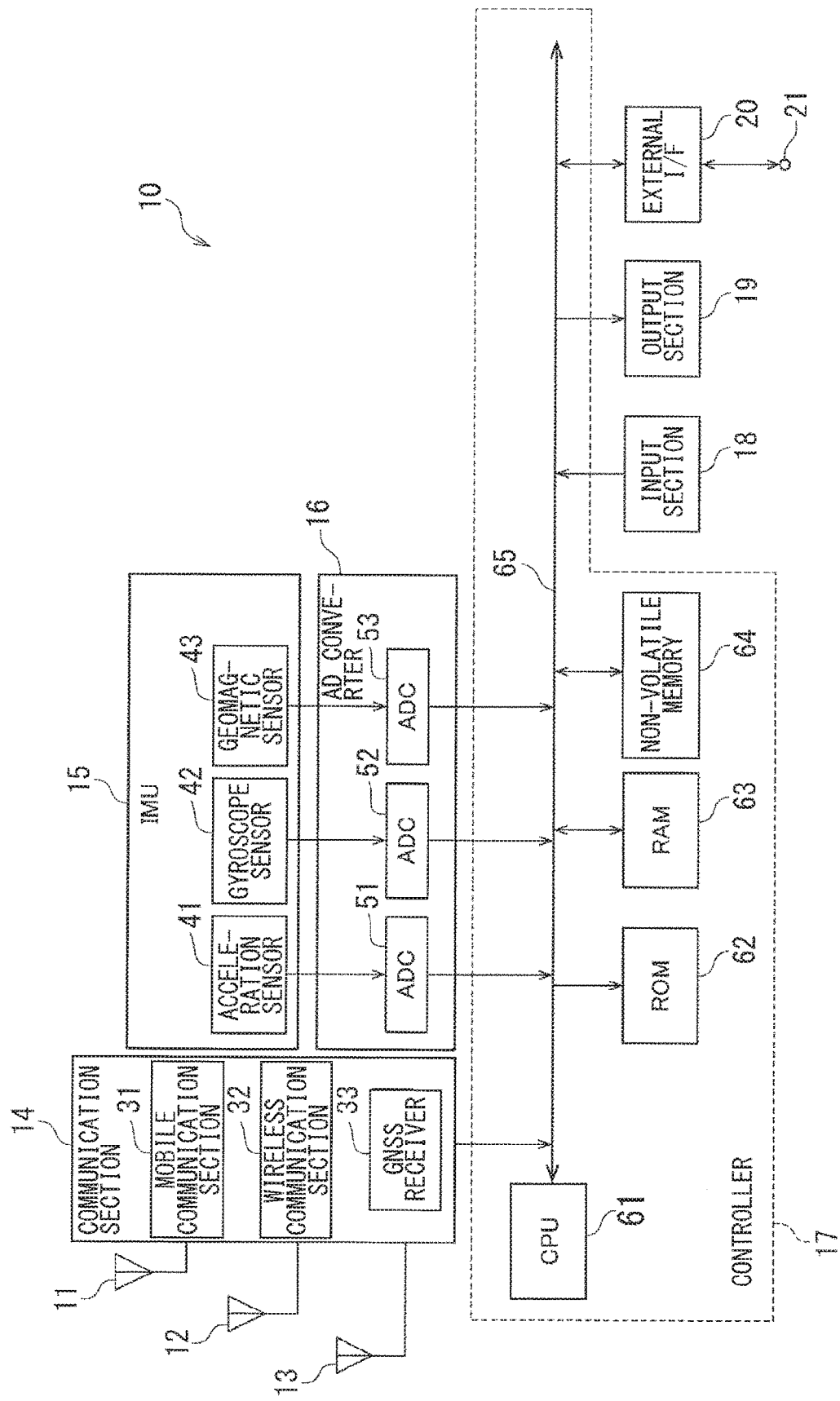

[FIG. 2]
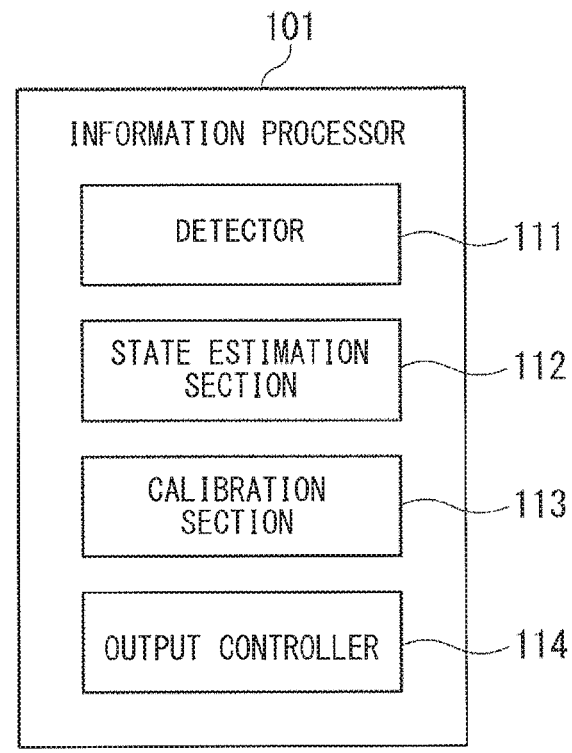
[FIG. 3]
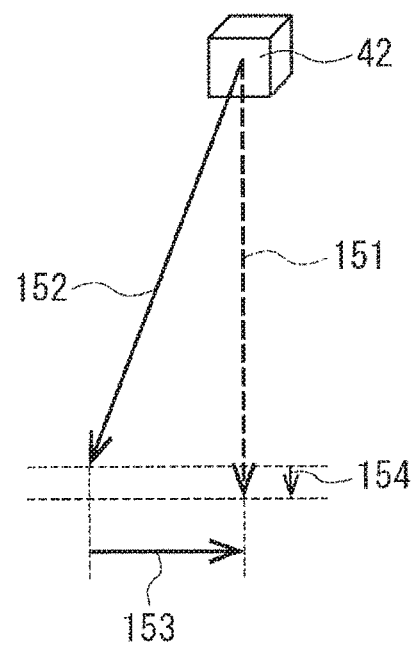

[FIG. 4]
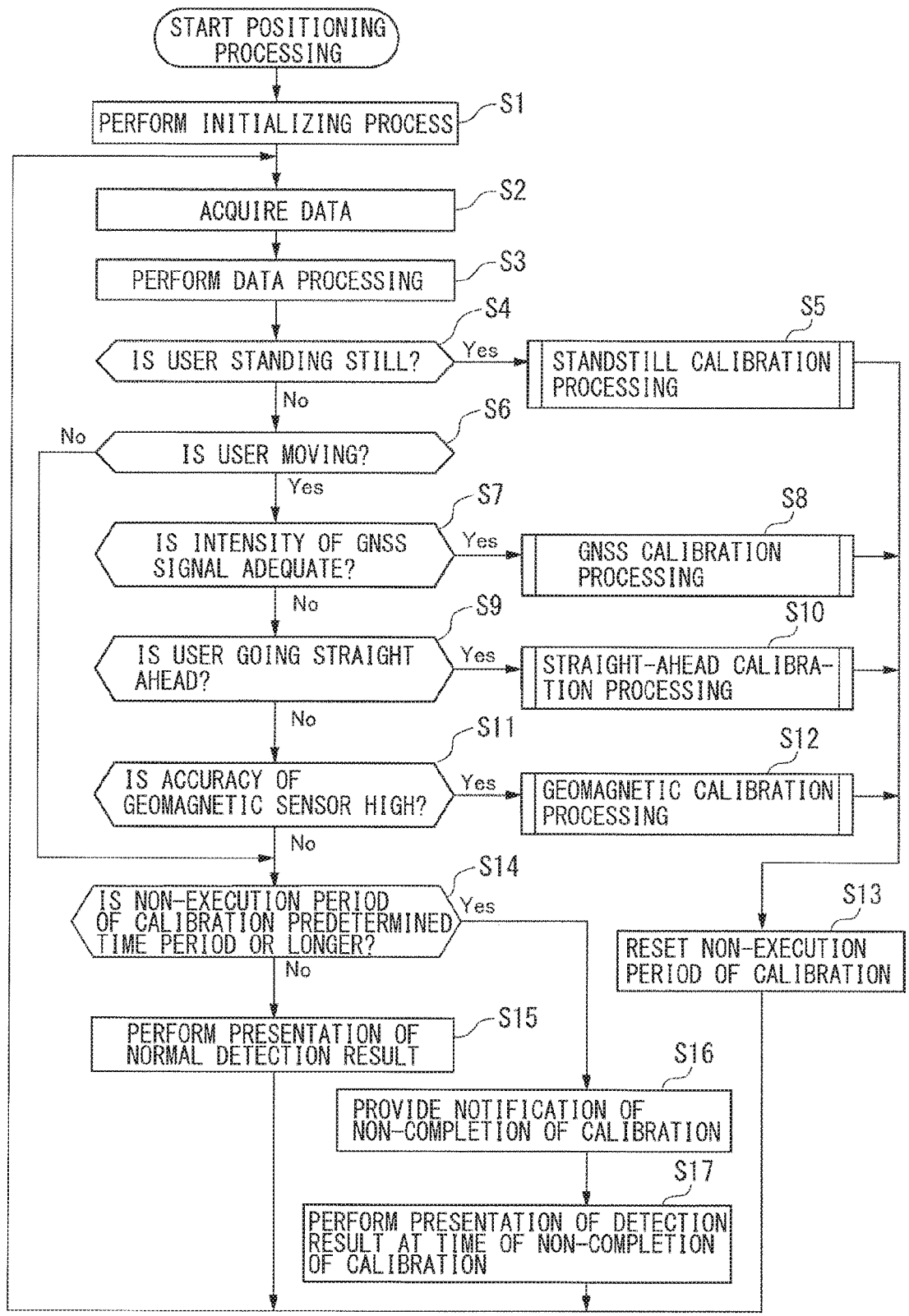

[ FIG. 5 ]
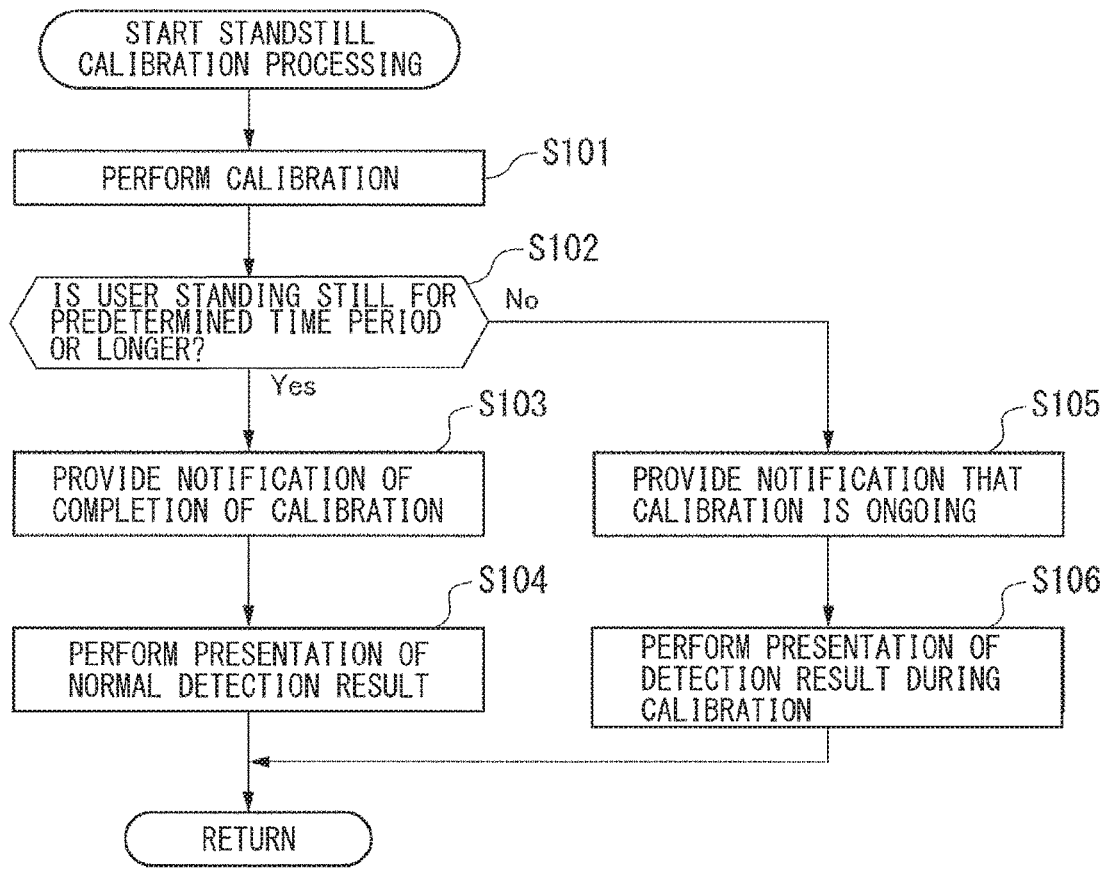

[FIG. 6]
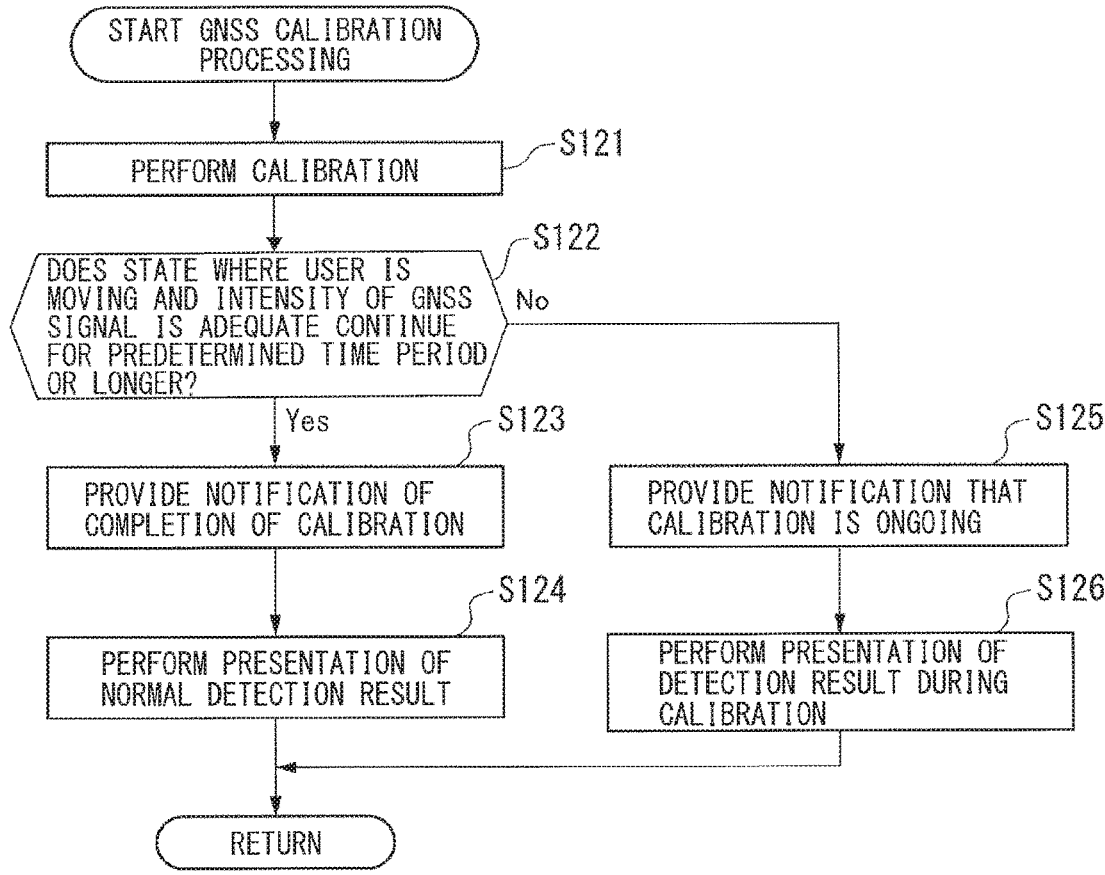
[FIG. 7]
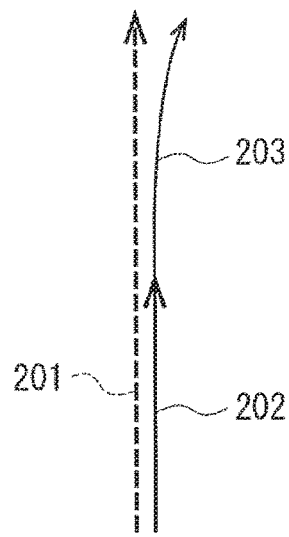

[FIG. 8]
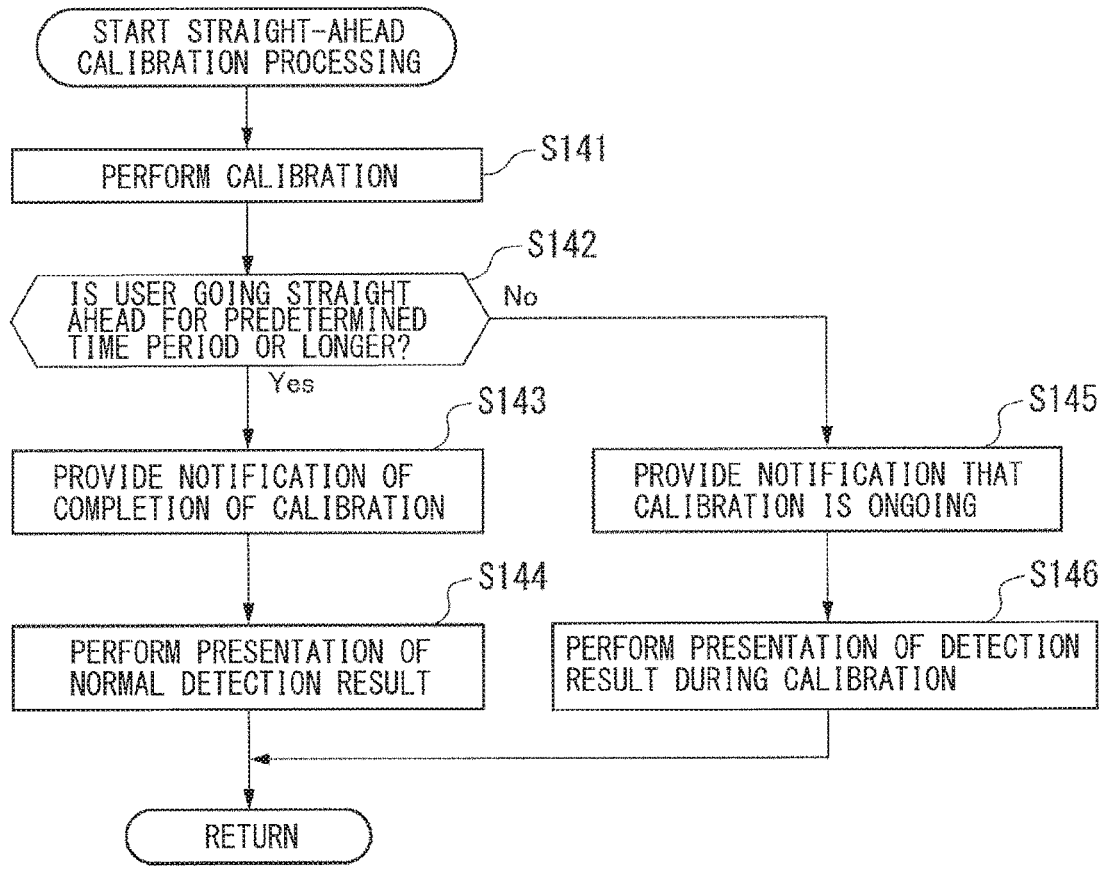
[FIG. 9]
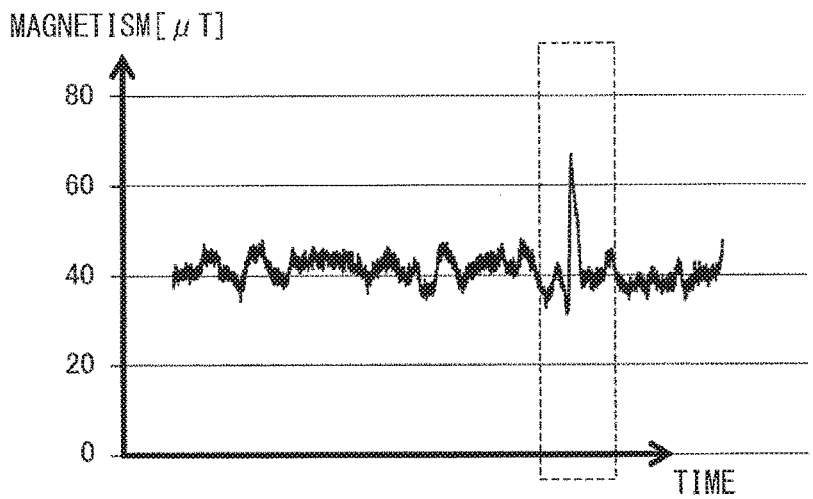

[ FIG. 10 ]
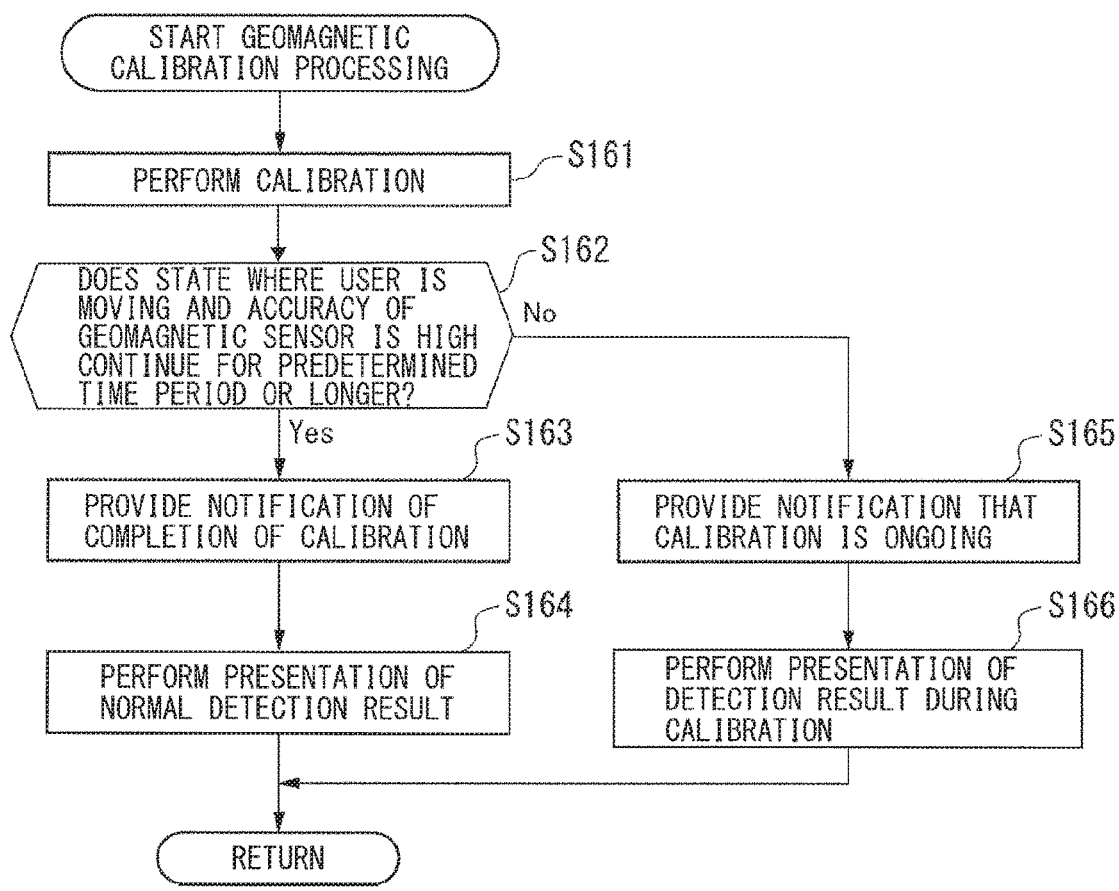

[FIG. 11]
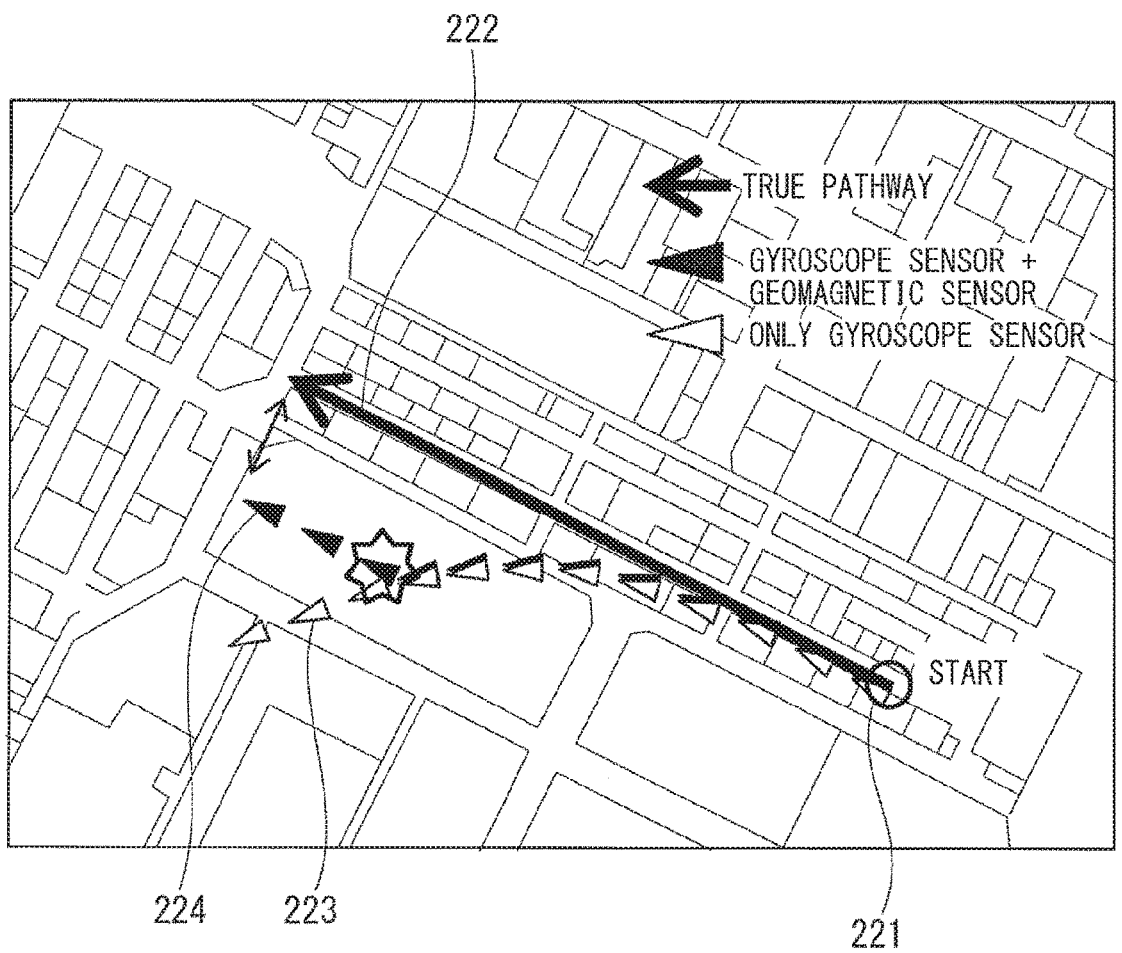

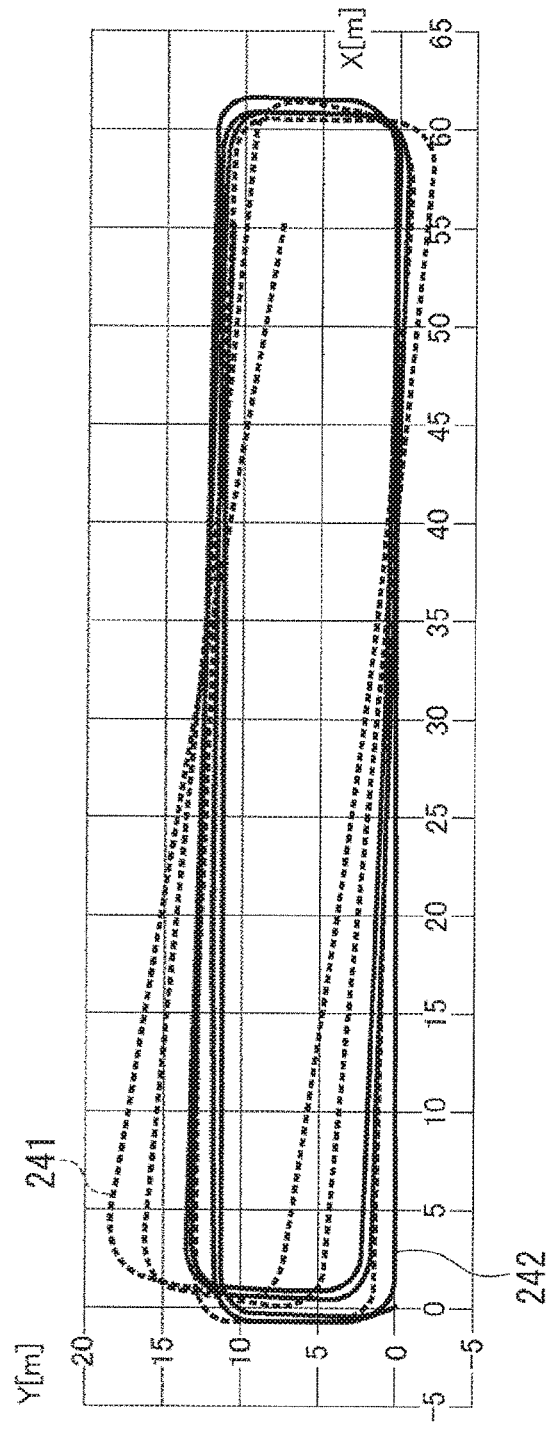
[FIG. 12]

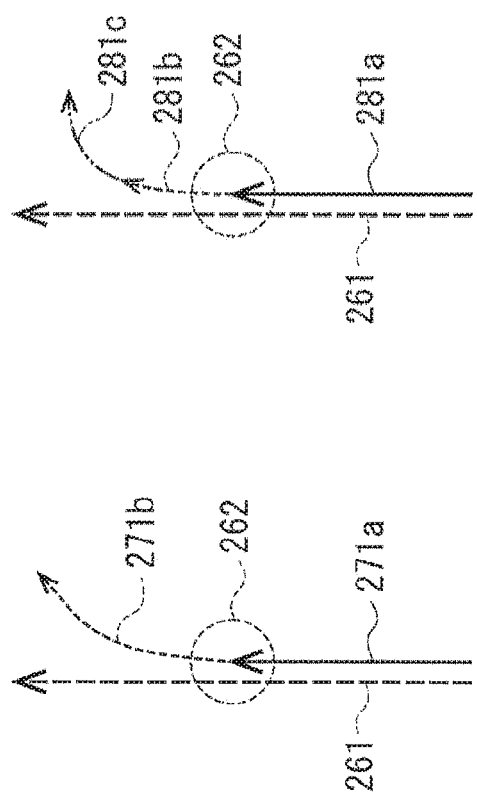

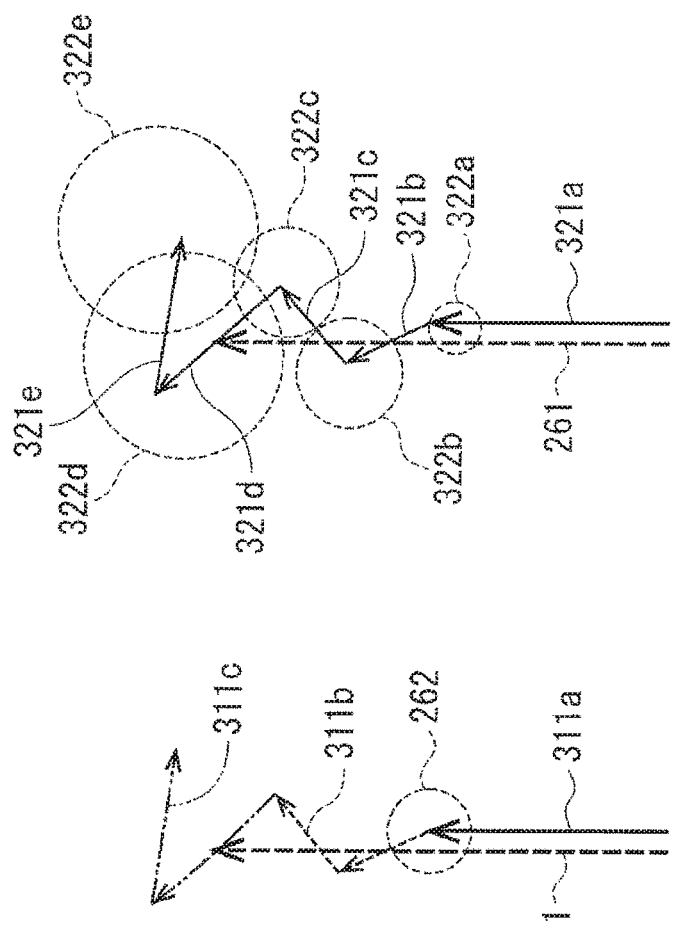

[ FIG. 15 ]
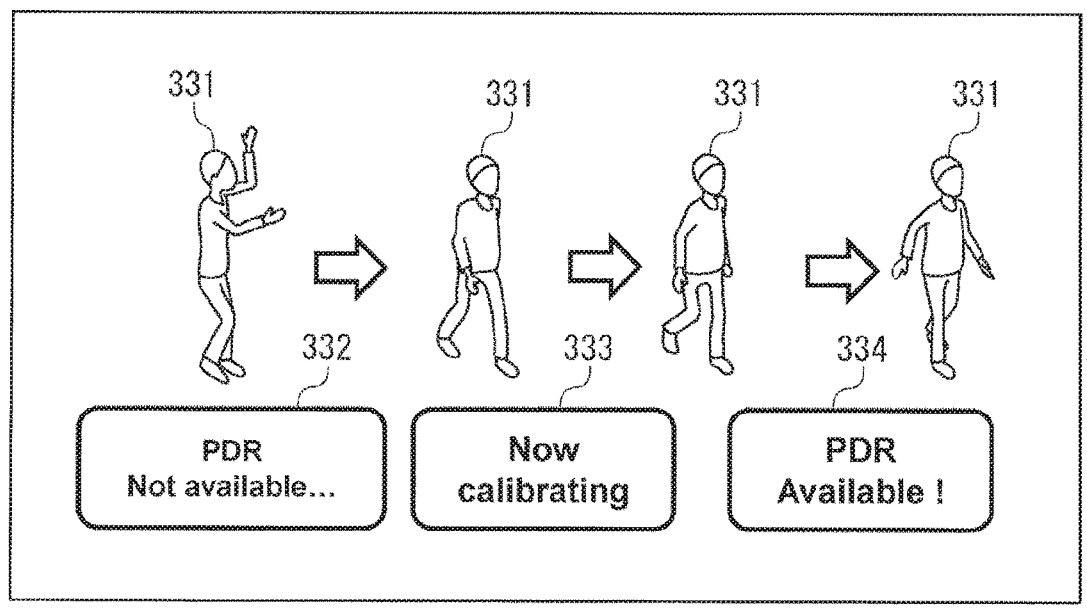
[ FIG. 16 ]
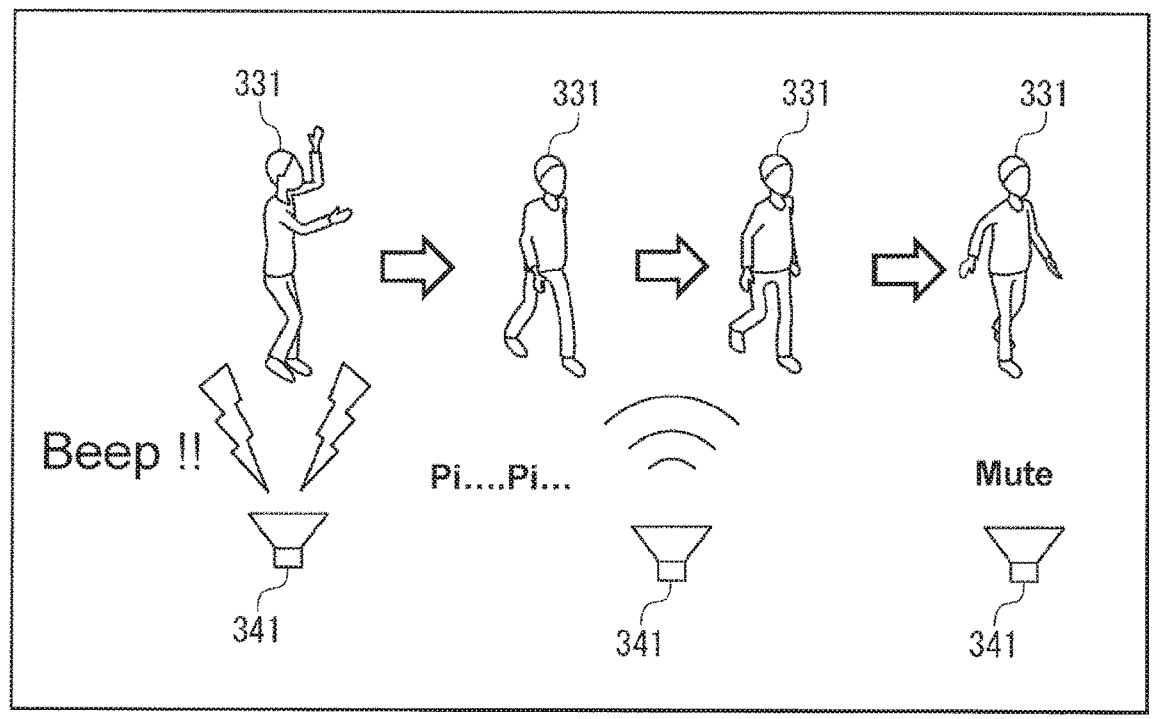

[ FIG. 17 ]
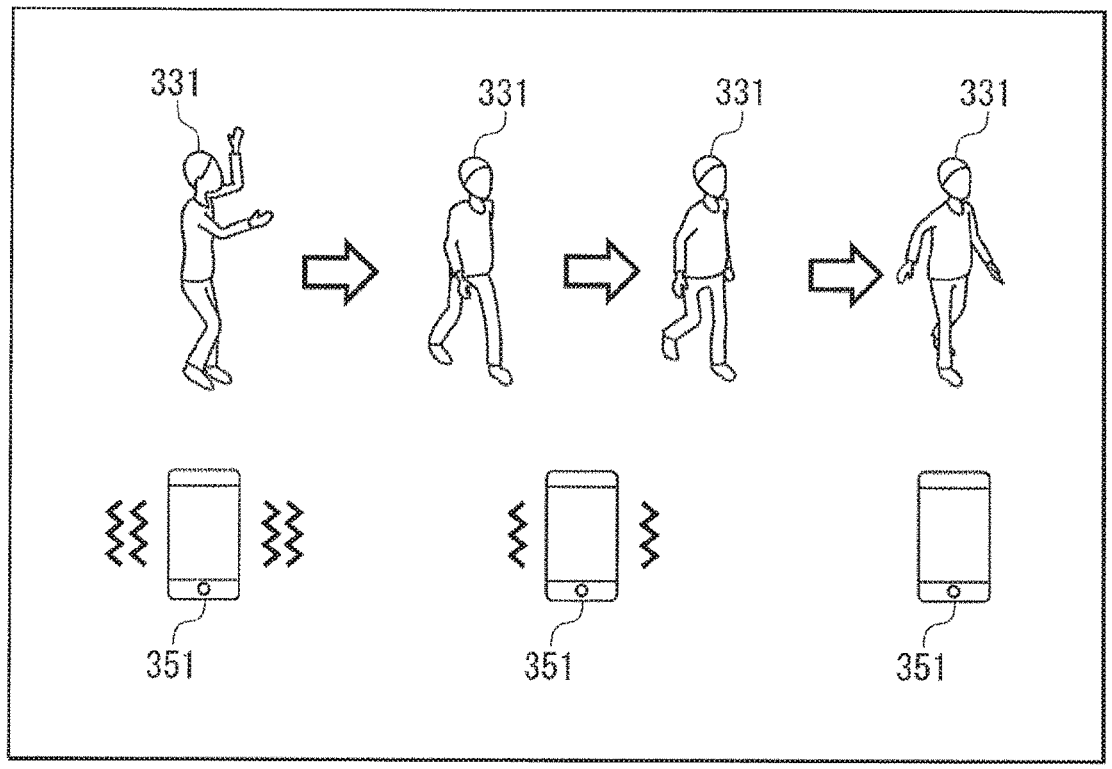
[ FIG. 18 ]
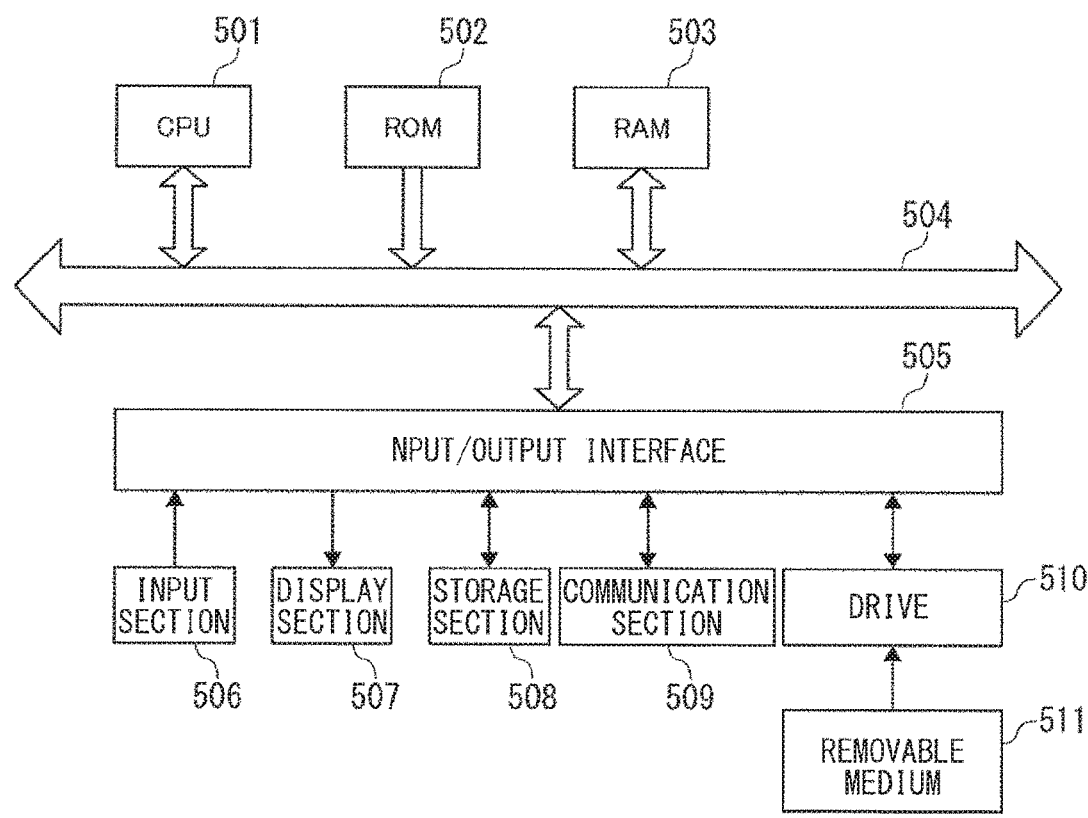

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/023555 filed on Jun. 21, 2018, which claims priority benefit of Japanese Patent Application No. JP 2017-132186 filed in the Japan Patent Office on Jul. 5, 2017. Each of the above-referenced applications is hereby incorporated herein by reference in its entirety.

TECHNICAL FIELD

The present technology relates to an information processing apparatus, an information processing method, and a program, and more particularly to an information processing apparatus, an information processing method, and a program that are preferred for use in a case of performing positioning and the like using an inertial sensor.

BACKGROUND ART

Satellite positioning with use of a GNSS (Global Navigation Satellite System) has been utilized frequently. Further, a technology has been proposed that evaluates the reliability of information to be calculated from a signal received from a positioning satellite, on the basis of walking pace of a user, and moving speed of the user that is calculated on the basis of the signal from the positioning satellite (for example, see PTL 1).

Further, in an indoor area and the like where the signal from the positioning satellite is not receivable, autonomous positioning such as pedestrian dead reckoning (PDR: Pedestrian Dead Reckoning) or inertial navigation has been utilized that uses an inertial sensor such as a gyroscope sensor or an acceleration sensor.

CITATION LIST

Patent Literature

PTL 1: Japanese Unexamined Patent Application Publication No. 2013-210299

SUMMARY OF THE INVENTION

Problems to be Solved by the Invention

Incidentally, the autonomous positioning involves cumulative errors of a detection position that are caused by an error of the inertial sensor, having a tendency toward an increase in the error of the detection position over time. To deal with this, for example, a countermeasure is taken that reduces the error of the detection position, by performing calibration of the inertial sensor when a user stands still to reduce the error of the inertial sensor.

However, for example, in a case where the user continues to move without standing still over a long time, calibration of the inertial sensor is not performed, resulting in an increase in the error of the detection position. As a result, for example, the user acts in accordance with the detection position including a significant error, which possibly causes a trouble such as getting lost.

The present technology is provided in consideration of such a situation, and makes it possible to properly report the reliability of information that is available with use of an inertial sensor.

Means for Solving the Problems

An information processing apparatus according to an embodiment of the present technology includes: a state estimation section that estimates a state of a predetermined object; and an output controller that controls, on the basis of an estimated state that is the estimated state of the object, output of reliability information indicating reliability of object information that is information of the object, the information of the object being available with use of an inertial sensor.

An information processing method according to an embodiment of the present technology includes: a state estimation step of estimating a state of a predetermined object; and an output control step of controlling, on the basis of an estimated state that is the estimated state of the object, output of reliability information indicating reliability of object information that is information of the object, the information of the object being available with use of an inertial sensor.

A program according to an embodiment of the present technology causes a computer to execute processing including: a state estimation step of estimating a state of a predetermined object; and an output control step of controlling, on the basis of an estimated state that is the estimated state of the object, output of reliability information indicating reliability of object information that is information of the object, the information of the object being available with use of an inertial sensor.

In an embodiment of the present technology, a state of a predetermined object is estimated, and output of reliability information indicating reliability of object information that is information of the object, the information of the object being available with use of an inertial sensor, is controlled on the basis of an estimated state that is the estimated state of the object.

Effects of the Invention

According to an embodiment of the present technology, it is possible to properly report the reliability of information that is available with use of an inertial sensor.

It is to be noted that the effects described above are not necessarily limitative, and any of effects described in the present disclosure may be provided.

BRIEF DESCRIPTION OF DRAWINGS

FIG. 1 is a block diagram illustrating an embodiment of an information processing apparatus to which the present technology is applied.

FIG. 2 is a block diagram illustrating a configuration example of an information processor.

FIG. 3 is a diagram describing an error caused by shifting of a zero-point bias.

FIG. 4 is a flowchart describing positioning processing.

FIG. 5 is a flowchart describing details of standstill calibration processing.

FIG. 6 is a flowchart describing details of GNSS calibration processing.

FIG. 7 is a diagram illustrating an example of a detection result of a heading in a case where a zero-point bias is shifted.

FIG. 8 is a flowchart describing details of straight-ahead calibration processing.

FIG. 9 is a graph illustrating an example of detection values of a geomagnetic sensor.

FIG. 10 is a flowchart describing details of geomagnetic calibration processing.

FIG. 11 is a diagram illustrating an example of comparing detection results of headings depending on presence or absence of a geomagnetic sensor.

FIG. 12 is a graph comparing detection results of movement trajectories of a user in cases where calibration is performed and no calibration is performed.

FIGS. 13A, 13B, and 13C are diagrams illustrating a first example of a method of presenting detection results of positions and headings of a user.

FIGS. 14A, 14B, and 14C are diagrams illustrating a second example of a method of presenting detection results of positions and headings of a user.

FIG. 15 is a diagram illustrating a first example of a method of providing notification of an execution status of calibration.

FIG. 16 is a diagram illustrating a second example of a method of providing notification of an execution status of calibration.

FIG. 17 is a diagram illustrating a third example of a method of providing notification of an execution status of calibration.

FIG. 18 is a diagram illustrating a configuration example of a computer.

MODES FOR CARRYING OUT THE INVENTION

Hereinafter, embodiments of the present technology will be described. Descriptions are given in the following order.
1. Embodiment
2. Modification Examples
3. Others

1. Embodiment

<Configuration Example of Information Processing Apparatus>

FIG. 1 is a block diagram illustrating an embodiment of an information processing apparatus to which the present technology is applied.

An example of an information processing apparatus 10 includes a user-portable or -wearable portable information terminal such as a smartphone, a mobile phone, or a wearable device.

The information processing apparatus 10 includes an antenna 11 to an antenna 13, a communication section 14, an IMU (Inertial Measurement Unit) 15, an AD (analog-to-digital) converter 16, a controller 17, an input section 18, an output section 19, an external I/F (interface) 20, and an input/output terminal 21. The communication section 14 includes a mobile communication section 31, a wireless communication section 32, and a GNSS receiver 33. The IMU 15 includes an acceleration sensor 41, a gyroscope sensor 42, and a geomagnetic sensor 43. The AD converter 16 includes an ADC (analog-to-digital converter) 51 to an ADC 53. The controller 17 includes a CPU (Central Processing Unit) 61, a ROM (Read-Only Memory) 62, a RAM (Random Access Memory) 63, and a non-volatile memory 64.

The communication section 14, the ADC 51 to the ADC 53, the CPU 61, the ROM 62, the RAM 63, the non-volatile memory 64, the input section 18, the output section 19, and the external I/F 20 are coupled to one another through a bus 65.

It is to be noted that, in a case where each of the sections coupled to the bus 65 performs communication through the bus 65, a description of the bus 65 is hereinafter omitted as appropriate. For example, in a case where the CPU 61 and the output section 19 perform communication with each other through the bus 65, it is simply described that the CPU 61 and the output section 19 perform communication.

The mobile communication section 31 performs mobile communication of a predetermined method with a mobile communication base station (not illustrated) through the antenna 11 and a mobile communication network (not illustrated). The mobile communication section 31 supplies received data to the controller 17, or acquires, from the controller 17, data to be transmitted.

The wireless communication section 32 performs wireless communication of a predetermined method (for example, Wi-Fi) with another apparatus or a wireless communication base station (not illustrated) through the antenna 12. The wireless communication section 32 supplies received data to the controller 17, or acquires, from the controller 17, data to be transmitted.

The GNSS receiver 33 receives a GNSS signal that is transmitted from a GNSS positioning satellite (not illustrated), and supplies the received GNSS signal to the controller 17.

The acceleration sensor 41 performs detection of acceleration in a triaxial direction of a pitch axis (x-axis), a roll axis (y-axis), and a yaw axis (z-axis) of the information processing apparatus 10, and supplies an acceleration signal indicating a detection result to the ADC 51.

The gyroscope sensor 42 performs detection of angular velocity for triaxial rotation of pitch axis rotation, roll axis rotation, and yaw axis rotation of the information processing apparatus 10, and supplies an angular velocity signal indicating a detection result to the ADC 52.

The geomagnetic sensor 43 performs detection of geomagnetism in the triaxial direction of the pitch axis, the roll axis, and the yaw axis of the information processing apparatus 10, and supplies a geomagnetic signal indicating a detection result to the ADC 53.

The ADC 51 converts an analog acceleration signal into digital acceleration data, and supplies the acceleration data to the controller 17.

The ADC 52 converts an analog angular velocity signal into digital angular velocity data, and supplies the angular velocity data to the controller 17.

The ADC 53 converts an analog geomagnetic signal into digital geomagnetic data, and supplies the geomagnetic data to the controller 17.

As a main element for processing and control in the controller 17, the CPU 61 executes a variety of programs to perform formation of a control signal to be supplied to each of the sections, various computations, and the like.

The ROM 62 stores and holds a variety of programs to be executed by the CPU 61, and data necessary for processing.

The RAM 63 stores data necessary for various processing on a temporary basis.

The non-volatile memory 64 includes, for example, an EEPROM, a flash memory, or the like. The non-volatile memory 64 stores and holds, for example, data to be held even if power of the information processing apparatus 10 is turned off (for example, parameter settings, added programs, and the like).

The input section 18 includes a variety of input devices directed to operating the information processing apparatus 10 and to entering data. For example, the input section 18 includes one or more of the input devices such as a button, a switch, a keyboard, a touch panel, a mouse, and a microphone. The input section 18 supplies an operational signal and acquired data to the controller 17.

The output section 19 includes a variety of output devices that perform output of various data by the use of visual information such as an image or light, auditory information such as a sound, tactile information such as vibration, or the like. For example, the output section 19 includes one or more of the output devices such as a display, a speaker, a lamp, and a vibrator.

The external I/F 20 is coupled to an external apparatus such as a personal computer through the input/output terminal 21. Thus, the input/output terminal 21 performs communication with the external apparatus through the external I/F 20.

<Configuration Example of Information Processor>

FIG. 2 illustrates a configuration example of an information processor 101 serving as a part of a function to be achieved by the CPU 61 executing a variety of programs.

The information processor 101 includes a detector 111, a state estimation section 112, a calibration section 113, and an output controller 114.

The detector 111 performs detection processing of a position and a heading of a user carrying or wearing the information processing apparatus 10, that is, positioning of such a user. For example, the detector 111 detects a position and a heading of the user through autonomous positioning with use of acceleration data and angular velocity data. For example, the detector 111 detects a position and a heading of the user through satellite positioning with use of a GNSS signal. For example, the detector 111 detects a heading of the user on the basis of geomagnetic data. The detector 111 supplies detection data indicating a result of each detection processing to each section of the information processing apparatus 10 on an as-needed basis.

The state estimation section 112 estimates a state of the user on the basis of the acceleration data, the angular velocity data, detection results of a position and a heading of the user, and the like. The detector 111 supplies state estimation data indicating an estimation result of the state of the user to each section of the information processing apparatus 10 on an as-needed basis. Further, the state estimation section 112 determines whether or not such a state corresponds to a state where calibration by the calibration section 113 is executable on the basis of the estimated state of the user, and the like.

The calibration section 113 performs calibration of the IMU 15 and information available from the use of the IMU 15. For example, the calibration section 113 performs calibration for a detection result of autonomous positioning with use of the acceleration sensor 41 and the gyroscope sensor 42. Further, for example, the calibration section 113 performs calibration for a zero-point bias of each of the acceleration sensor 41 and the gyroscope sensor 42.

Here, the zero-point bias is a bias value directed to correcting a detection value of acceleration or angular velocity, and is set up on the basis of a value of an acceleration signal or an angular velocity signal of the acceleration sensor 41 or the gyroscope sensor 42 in a case where the acceleration or the angular velocity is zero, for example.

The zero-point bias varies with time, ambient temperature, and the like, for example. Such variation in the zero-point bias, and resultant shifting of a setting value from an actual value cause errors in various information available from the use of the acceleration sensor 41 or the gyroscope sensor 42.

For example, if shifting arises in a setting value of the zero-point bias of the gyroscope sensor 42, an error is caused in an attitude angle to be detected using the gyroscope sensor 42. In particular, an error is caused in a detection result of attitude angles of pitch-axis rotation and roll-axis rotation. As a result, for example, as illustrated in FIG. 3, a direction of an arrow 152 is falsely recognized as a gravity direction relative to a true gravity direction 151, and a portion of gravity acceleration is falsely recognized as movement acceleration. For example, the movement acceleration in a horizontal direction that is denoted by an arrow 153, and the movement acceleration in a vertical direction that is denoted by an arrow 154 are falsely recognized. This results in an increase in the error particularly in the horizontal direction, causing errors in detection of speed, position, and the like with use of autonomous positioning such as the PDR or the inertial navigation, for example.

The output controller 114 controls output of a variety of data from the output section 19.

<Positioning Processing>

Next, positioning processing that is performed by the information processing apparatus 10 is described with reference to a flowchart in FIG. 4. For example, this processing starts when the information processing apparatus 10 is powered on, and ends when the information processing apparatus 10 is powered off.

In Step S1, the information processing apparatus 10 performs an initializing process. For example, the detector 111 sets variation amount of a position of the user and variation amount of a heading of the user in autonomous positioning at zero. For example, the calibration section 113 performs initialization of the acceleration sensor 41, the gyroscope sensor 42, and the geomagnetic sensor 43. For example, the calibration section 113 sets the zero-point bias of each of the acceleration sensor 41 and the gyroscope sensor 42 at a predetermined initial value.

In Step S2, the information processing apparatus 10 acquires data.

For example, the acceleration sensor 41 performs detection of acceleration in the triaxial direction of the pitch axis, the roll axis, and the yaw axis of the information processing apparatus 10, and supplies the acceleration signal indicating a detection result to the ADC 51. The ADC 51 converts the analog acceleration signal into the digital acceleration data, and supplies the acceleration data to the CPU 61, or causes the RAM 63 to store such data.

For example, the gyroscope sensor 42 performs detection of angular velocity for triaxial rotation of pitch axis rotation, roll axis rotation, and yaw axis rotation of the information processing apparatus 10, and supplies the angular velocity signal indicating a detection result to the ADC 52. The ADC 52 converts the analog angular velocity signal into the digital angular velocity data, and supplies the angular velocity data to the CPU 61, or causes the RAM 63 to store such data.

For example, the geomagnetic sensor 43 performs detection of geomagnetism in the triaxial direction of the pitch axis, the roll axis, and the yaw axis of the information processing apparatus 10, and supplies the geomagnetic signal indicating a detection result to the ADC 53. The ADC 53 converts the analog geomagnetic signal into the digital geomagnetic data, and supplies the geomagnetic data to the CPU 61, or causes the RAM 63 to store such data.

For example, the GNSS receiver 33 receives the GNSS signal from the positioning satellite, and supplies the GNSS signal to the CPU 61, or causes the RAM 63 to store a value and intensity of the GNSS signal.

It is to be noted that each piece of data stored in the RAM 63 is held (buffered) at least during a period necessary for processing, and is thereafter erased as appropriate.

In Step S3, the information processing apparatus 10 performs data processing.

For example, the detector 111 detects a position and a heading of the user through autonomous positioning on the basis of acceleration data and angular velocity data. It is to be noted that, at this time, for example, values of the acceleration data and the acceleration data are corrected on the basis of a setting of the zero-point bias.

For example, in a case of detecting a position and a heading of the user with use of the PDR, the detector 111 calculates step-count-derived velocity (=a walking pitch×a length of stride) on the basis of the acceleration data and the angular velocity data. Further, the detector 111 detects a heading of the user by regarding angular velocity in a yaw direction that is detected by the gyroscope sensor 42 as a variation amount in the heading and by integrating the angular velocity. In addition, the detector 111 detects a position of the user by integrating the step-count-derived velocity and the variation amount in the heading.

Further, for example, in a case of detecting a position and a heading of the user with use of the inertial navigation, the detector 111 detects an attitude angle of the information processing apparatus 10 by integrating the angular velocity detected by the gyroscope sensor 42. Additionally, the detector 111 converts acceleration detected by the acceleration sensor 41 into acceleration of a global coordinate system on the basis of the detected attitude angle. Thereafter, the detector 111 detects a velocity of the information processing apparatus 10 by integrating the acceleration converted into the global coordinate system, and detects a position of the information processing apparatus 10 by further integrating the detected velocity. A position and a heading of the user are detected on the basis of the position and the attitude angle of the information processing apparatus 10 that are detected in such a manner.

It is to be noted that the frequency of integration processing necessary for positional detection in the PDR is lower as compared with the inertial navigation, resulting in late spreading of positional integration errors. Meanwhile, for example, if the information processing apparatus 10 is directed toward a direction that is significantly different from a heading of the user, the PDR has a greater detection error in the heading.

In contrast, in the inertial navigation, even if the information processing apparatus 10 is directed toward a direction that is significantly different from the heading of the user, it is possible to accurately detect the heading. Meanwhile, the frequency of integration processing necessary for positional detection in the inertial navigation is higher as compared with the PDR, resulting in early spreading of positional integration errors.

Therefore, for example, in a case where wearing position and orientation of the information processing apparatus 10 are fixed, the PDR is used. In contrast, for example, in a case where a high-accuracy error correction means is available, the inertial navigation is used.

Further, for example, the detector 111 detects a position of the user (the information processing apparatus 10) through the satellite positioning on the basis of the GNSS signal.

Additionally, for example, the detector 111 detects a heading of the user (the information processing apparatus 10) on the basis of the geomagnetic data.

It is to be noted that, in the PDR or the inertial navigation, initial values of a position and a heading of the user at the start of detection use, for example, a position detected on the basis of the GNSS signal, a heading that is detected on the basis of the geomagnetic data, the heading that is detected on the basis of the acceleration data, and the like.

The detector 111 causes the RAM 63 to store detection data indicating a result of each detection processing. Each detection data stored in the RAM 63 is held (buffered) at least during a period necessary for processing, and is thereafter erased as appropriate.

Further, for example, the state estimation section 112 estimates a state of the user on the basis of the acceleration data, the angular velocity data, detection results of a position and a heading of the user, and the like. For example, the state estimation section 112 estimates whether the user is standing still or moving, or is in another unknown state. Here, the unknown state refers to a state where neither a standing-still state nor a moving state of the user is determinable, for example, because the user rotates the information processing apparatus 10, or any other state.

It is to be noted that any given method is adoptable for a method of estimating a state of the user. For example, it is determined whether the user is standing still or moving on the basis of whether or not dispersion of acceleration and angular velocity is equal to or less than a threshold. Further, for example, in a case where a user detection position is moved although it is determined that the user is standing still, or in a case where a user detection position is stationary although it is determined that the user is moving, it is estimated that a state of the user is an unknown state. Additionally, for example, also in a case where the user him/herself does not move, but the user is moving by riding in a movable body such as a vehicle, it is possible to set to determine that the user is moving. In such a case, even if the user is standing still inside the movable body, it is determined that the user is moving.

The state estimation section 112 causes the RAM 63 to store state data indicating a result of estimating a state of the user. The state data stored in the RAM 63 is held (buffered) at least during a period necessary for processing, and is thereafter erased as appropriate.

In Step S4, the state estimation section 112 determines whether or not the user is standing still on the basis of a processing result of Step S3. In a case where it is determined that the user is standing still, the processing proceeds to Step S5. That is, the state estimation section 112 determines that such a state corresponds to a state where standstill calibration is executable because the user is standing still.

In Step S5, the information processing apparatus 10 performs the standstill calibration processing, and thereafter the processing proceeds to Step S13. Here, the standstill calibration processing is described in detail with reference to a flowchart in FIG. 5.

In Step S101, the calibration section 113 performs calibration. Specifically, the calibration section 113 regards a current value of the acceleration data as a signal value of the acceleration sensor 41 at acceleration of zero. Thereafter, the calibration section 113 performs correction for the zero-point bias of the acceleration sensor 41 on the basis of the current value of the acceleration data. Further, the calibration section 113 regards a current value of the angular velocity data as a signal value of the gyroscope sensor 42 at angular velocity of zero. Thereafter, the calibration section 113 performs correction for the zero-point bias of the gyroscope sensor 42 on the basis of the current value of the angular velocity data.

Such standstill calibration is applicable to both cases of the PDR and the inertial navigation.

In Step S102, the state estimation section 112 determines whether or not the user has been standing still for a predetermined time period or longer. In a case where it is determined that the user has been standing still for the predetermined time period or longer, that is, in a case where a state where the standstill calibration is executable has continued for the predetermined time period or longer, and the standstill calibration has been performed continuously for the predetermined time period or longer, the processing proceeds to Step S103.

It is to be noted that the predetermined time period is set at a sufficient amount of time (for example, five seconds) to ensure that the standstill calibration is performed accurately.

In Step S103, the output section 19 provides notification of completion of the calibration under control of the output controller 114. It is to be noted that any given method is adoptable for this notification. The user is notified of completion of the calibration by the use of, for example, visual information such as an image or light, auditory information such as a sound, tactile information such as vibration, or a combination of such information.

In Step S104, the output section 19 performs presentation of a normal detection result under control of the output controller 114. For example, the output section 19 performs display of current position and heading of the user while providing notification that the calibration is completed or that the reliability is high because the calibration is completed.

Thereafter, the standstill calibration is completed.

In contrast, in Step S102, in a case where it is determined that the user has not yet been standing still for the predetermined time period or longer, that is, in a case where the standstill calibration has not yet been performed continuously for the predetermined time period or longer, the processing proceeds to Step S105.

In Step S105, the output section 19 provides notification that the calibration is ongoing, under control of the output controller 114. It is to be noted that any given method is adoptable for this notification. The user is notified that the calibration is ongoing by the use of, for example, visual information such as an image or light, auditory information such as a sound, tactile information such as vibration, or a combination of such information.

In Step S106, the output section 19 performs presentation of a detection result during the calibration under control of the output controller 114. For example, the output section 19 performs display of current position and heading of the user while providing notification that the calibration is ongoing or that the reliability is low because the calibration is ongoing. Alternatively, for example, the output section 19 stops updating of display of the position and the heading of the user, and provides notification that the position and the heading of the user are not updatable because the calibration is ongoing.

Thereafter, the standstill calibration is completed.

Returning back to FIG. 4, in contrast, in Step S4, in a case where it is determined that the user is not standing still, the processing proceeds to Step S6.

In Step S6, the state estimation section 112 determines whether or not the user is moving on the basis of a result from processing of Step S3. In a case where it is determined that the user is moving, the processing proceeds to Step S7.

In Step S7, the state estimation section 112 determines whether or not intensity of the GNSS signal is adequate. In a case where the intensity of the current GNSS signal is equal to or more than a predetermined threshold, the state estimation section 112 determines that the intensity of the GNSS signal is adequate, and the processing proceeds to Step S8. That is, because the user is moving, and the intensity of the GNSS signal is adequate, the state estimation section 112 determines that such a state corresponds to a state where GNSS calibration is executable.

It is to be noted that the threshold of the GNSS signal intensity is set at, for example, a value (for example, 35 dB) ensuring that the reliability of the GNSS signal becomes equal to or more than a predetermined threshold.

In Step S8, the information processing apparatus 10 performs the GNSS calibration processing, and thereafter the processing proceeds to Step S13. Here, the GNSS calibration processing is described in detail with reference to a flowchart in FIG. 6.

In Step S121, the calibration section 113 performs calibration.

Specifically, in a case where the intensity of the GNSS signal is adequate, the satellite positioning is typically higher than the autonomous positioning in the position detection accuracy. Further, in a case where the intensity of the GNSS signal is adequate, if the user is moving, the detection accuracy of a heading that is based on a position detected by the satellite positioning typically becomes higher than the detection accuracy of the heading with use of the autonomous positioning. In addition, a time interval (for example, one millisecond) of the autonomous positioning is typically shorter than a time interval (for example, one second) of the satellite positioning.

Therefore, for example, the calibration section 113 interpolates a detection result of a position and a heading through the use of the satellite positioning having a long positioning time interval with a detection result of the position and the heading through the use of the autonomous positioning having a short positioning time interval. At this time, the calibration section 113 corrects the detection result of the position and the heading through the use of the autonomous positioning to ensure that the position and the heading vary smoothly.

Further, the calibration section 113 performs correction for the zero-point bias of each of the acceleration sensor 41 and the gyroscope sensor 42 on the basis of differences in the position and the heading that are detected through the use of the satellite positioning and the position and the heading that are detected through the use of the autonomous positioning, and the like.

Such GNSS calibration is applicable to both cases of the PDR and the inertial navigation. It is to be noted that the calibration is executable at all times in an outdoor area where the intensity of the GNSS signal is high, and thus the inertial navigation in which integration errors spread earlier as described above achieves more enhanced effect of the GNSS calibration.

In Step S122, the state estimation section 112 determines whether or not a state where the user is moving, and the intensity of the GNSS signal is adequate has continued for a predetermined time period or longer. For example, in a case where a state where it is estimated that the user is moving, and a state where the intensity of the GNSS signal is equal to or more than a predetermined threshold (for example, 35 dB) have continued for a predetermined time period or longer, the state estimation section 112 determines that the state where the user is moving, and the intensity of the GNSS signal is adequate has continued for the predetermined time period or longer, and the processing proceeds to Step S123. That is, in a case where a state where the GNSS calibration is executable has continued for a predetermined time period or longer, and the GNSS calibration has been performed continuously for the predetermined time period or longer, the processing proceeds to Step S123.

It is to be noted that the predetermined time period is set at a sufficient amount of time (for example, ten seconds) to ensure that the GNSS calibration is performed accurately.

Thereafter, in Step S123 and Step S124, processing steps similar to those of Step S103 and Step S104 in FIG. 5 are performed, and the GNSS calibration is completed.

In contrast, in Step S122, in a case where it is determined that the state where the user is moving, and the intensity of the GNSS signal is adequate has not yet continued for the predetermined time period or longer, that is, in a case where the GNSS calibration has not yet been performed continuously for the predetermined time period or longer, the processing proceeds to Step S125.

Thereafter, in Step S125 and Step S126, processing steps similar to those of Step S105 and Step S106 in FIG. 5 are performed, and the GNSS calibration is completed.

Returning back to FIG. 4, in contrast, in Step S7, in a case where it is determined that the intensity of the GNSS signal is not adequate, the processing proceeds to Step S9.

In Step S9, the state estimation section 112 determines whether or not the user is going straight ahead. For example, in a case where a state where it is estimated that the user is moving continues for one second or more, and a variation amount in a detection result of a heading of the user for the last one second is within a predetermined threshold, the state estimation section 112 determines that the user is going straight ahead, and the processing proceeds to Step S10. That is, the state estimation section 112 determines that such a state corresponds to a state where straight-ahead calibration is executable because the user is going straight ahead.

For example, in a case where the user is going straight ahead as indicated with an arrow 201 in FIG. 7, if the zero-point bias of the gyroscope sensor 42 is set accurately, a detection result of a heading of the user becomes a straight-ahead direction as indicated with an arrow 202.

In contrast, if the zero-point bias of the gyroscope sensor 42 varies, and any shift arises between the zero-point bias and a setting value thereof, the detection result of the heading of the user varies gradually as indicated with an arrow 203 although the user is going straight ahead. However, such a variation amount is a significantly small value.

Further, in an indoor area where the autonomous positioning is mainly performed, the user passes through a straight pathway at high frequency.

Therefore, in a case where a variation amount in the detection result of the heading of the user for the last one second is within a predetermined threshold, the state estimation section 112 determines that the heading varies due to variation in the zero-point bias, and that the user is actually going straight ahead.

It is to be noted that the threshold for a variation amount of the heading is set at a value (for example, five degrees) that makes it possible to separate, with a high probability, for example, a case where the zero-point bias varies and a case where the user is actually changing the heading. For example, this threshold is set up on the basis of an experiment, machine learning, and the like.

Further, the variation amount of the heading may be calculated, for example, on the basis of a distribution of detection values of the heading for the last one second, or may be calculated, for example, from a difference between a detection value one second before and a current detection value.

In Step S10, the information processing apparatus 10 performs the straight-ahead calibration processing, and thereafter the processing proceeds to Step S13. Here, the straight-ahead calibration processing is described in detail with reference to a flowchart in FIG. 8.

In Step S141, the calibration section 113 performs calibration.

Specifically, in a case where the user is going straight ahead, the angular velocity of yaw-axis rotation of the user becomes zero degrees. Therefore, the calibration section 113 regards a current value of the angular velocity data of the yaw-axis rotation as a signal value of the gyroscope sensor 42 at the angular velocity of the yaw-axis rotation of zero. Thereafter, the calibration section 113 performs correction for the zero-point bias of the yaw-axis rotation of the gyroscope sensor 42 on the basis of a current value of the angular velocity data of the yaw-axis rotation.

It is to be noted that, because the straight-ahead calibration is unable to calibrate the angular velocity of roll-axis rotation and pitch-axis rotation, such calibration is only applicable to the PDR, and is not applicable to the inertial navigation.

In Step S142, the state estimation section 112 determines whether or not the user has been going straight ahead for a predetermined time period or longer. For example, in a case where a state where it is estimated that the user is moving has continued for the predetermined time period or longer, and a variation amount in a detection result of the heading of the user within a predetermined latest time frame is within a predetermined threshold, the state estimation section 112 determines that the user has been going straight ahead for the predetermined time period or longer, and the processing proceeds to Step S143. That is, in a case where a state where the straight-ahead calibration is executable has continued for the predetermined time period or longer, and the straight-ahead calibration has been performed continuously for the predetermined time period or longer, the processing proceeds to Step S143.

It is to be noted that the predetermined time period is set at a sufficient amount of time (for example, ten seconds) to ensure that the straight-ahead calibration is performed accurately.

Further, the threshold for a variation amount of the heading is set at a value similar to that in the processing of Step S9, for example. In addition, the variation amount of the heading is also calculated by a method similar to that in the processing of Step S9.

Thereafter, in Step S143 and Step S144, processing steps similar to those of Step S103 and Step S104 in FIG. 5 are performed, and the straight-ahead calibration is completed.

In contrast, in Step S142, in a case where it is determined that the user has not yet been going straight ahead for the predetermined time period or longer, that is, in a case where the straight-ahead calibration has not yet been performed continuously for the predetermined time period or longer, the processing proceeds to Step S145.

Thereafter, in Step S145 and Step S146, processing steps similar to those of Step S105 and Step S106 in FIG. 5 are performed, and the straight-ahead calibration is completed.

Returning back to FIG. 4, in contrast, in Step S9, in a case where it is determined that the user is not going straight ahead, the processing proceeds to Step S11.

In Step S11, the state estimation section 112 determines whether or not the accuracy of the geomagnetic sensor 43 is high.

FIG. 9 is a graph illustrating an example of detection values (geomagnetic absolute values) of the geomagnetic sensor 43. A horizontal axis denotes time, and a vertical axis denotes magnetism (in units of μT).

For example, if disturbance and bias in a magnetic distribution around the geomagnetic sensor 43 are small, variations in detection values of the geomagnetic sensor 43 become small, resulting in higher detection accuracy. In contrast, if the disturbance and bias in the magnetic distribution around the geomagnetic sensor 43 become great, variations in the detection values of the geomagnetic sensor 43 become great as indicated in the inside of a dotted-line box in FIG. 9, resulting in lower detection accuracy.

Therefore, for example, in a case where a variation amount of the detection values of the geomagnetic sensor 43 for the last one second is within a predetermined threshold, the state estimation section 112 determines that the accuracy of the geomagnetic sensor 43 is high, and the processing proceeds to Step S12. That is, because the user is moving, and the accuracy of the geomagnetic sensor 43 is high, the state estimation section 112 determines that such a state corresponds to a state where geomagnetic calibration is executable.

It is to be noted that the threshold for the variation amount of the detection values of the geomagnetic sensor 43 is set at, for example, a value (for example, 5 μT) ensuring that the accuracy of the detection values of the geomagnetic sensor 43 becomes equal to or more than a predetermined threshold.

Further, the variation amount of the detection values of the geomagnetic sensor 43 may be calculated, for example, on the basis of a distribution of detection values for the last one second, or may be calculated, for example, from a difference between a detection value one second before and a current detection value.

In Step S12, the information processing apparatus 10 performs geomagnetic calibration processing, and thereafter the processing proceeds to Step S13. Here, the geomagnetic calibration processing is described in detail with reference to a flowchart in FIG. 10.

In Step S161, the calibration section 113 performs calibration.

Specifically, in a case where the accuracy of the geomagnetic sensor 43 is high, a heading of yaw-axis rotation is detected with high accuracy on the basis of a detection value of the geomagnetic sensor 43. Therefore, the calibration section 113 corrects the heading that is detected by the autonomous positioning on the basis of the heading that is detected by the geomagnetic sensor 43. This leads to an increase in the detection accuracy of the heading of the user.

For example, FIG. 11 illustrates an example of comparing detection results of headings depending on presence or absence of the geomagnetic sensor 43 in a case where the user goes straight ahead from a starting point 221 to a direction of an arrow 222. Specifically, an arrow 223 indicates an example of a detection result in a case where only the gyroscope sensor 42 is used without using the geomagnetic sensor 43. In contrast, an arrow 224 indicates an example of a detection result in a case where both of the gyroscope sensor 42 and the geomagnetic sensor 43 are used.

For example, even if a detection result of the heading of the user begins to depart from the direction of the arrow 222 as indicated with the arrow 223 due to variation in the zero-point bias of the gyroscope sensor 42, the detection result of the heading of the user is corrected to the direction of the arrow 222 as indicated with the arrow 224 with use of the geomagnetic sensor 43.

Further, the calibration section 113 performs correction for the zero-point bias of the angular velocity of yaw-axis rotation of the gyroscope sensor 42 on the basis of a difference between the heading that is detected using the geomagnetic sensor 43 and the heading that is detected using the autonomous positioning, and the like.

It is to be noted that, because the straight-ahead calibration is unable to calibrate the angular velocity of roll-axis rotation and pitch-axis rotation, such calibration is only applicable to the PDR, and is not applicable to the inertial navigation. Further, the straight-ahead calibration is executable irrespective of whether or not the user is going straight ahead. In addition, the geomagnetic sensor 43 is typically lower than the GNSS receiver 33 in power consumption, making it possible to perform calibration at low power consumption.

In Step S162, the state estimation section 112 determines whether or not a state where the user is moving, and the accuracy of the geomagnetic sensor 43 is high has continued for a predetermined time period or longer. For example, in a case where a state where it is estimated that the user is moving, and a state where a variation amount of the detection values of the geomagnetic sensor 43 is within a predetermined threshold (for example, 5 μT) have continued for a predetermined time period or longer, the state estimation section 112 determines that the state where the user is moving, and the accuracy of the geomagnetic sensor 43 is high has continued for the predetermined time period or longer, and the processing proceeds to Step S163. That is, in a case where a state where the geomagnetic calibration is executable has continued for a predetermined time period or longer, and the geomagnetic calibration has been performed continuously for the predetermined time period or longer, the processing proceeds to Step S163.

It is to be noted that the predetermined time period is set at a sufficient amount of time (for example, ten seconds) to ensure that the geomagnetic calibration is performed accurately.

Thereafter, in Step S163 and Step S164, processing steps similar to those of Step S103 and Step S104 in FIG. 5 are performed, and the geomagnetic calibration is completed.

In contrast, in Step S162, in a case where it is determined that the state where the user is moving, and the accuracy of the geomagnetic sensor 43 is high has not yet continued for the predetermined time period or longer, that is, in a case where the geomagnetic calibration has not yet been performed continuously for the predetermined time period or longer, the processing proceeds to Step S165.

Thereafter, in Step S165 and Step S166, processing steps similar to those of Step S105 and Step S106 in FIG. 5 are performed, and the geomagnetic calibration is completed.

Returning back to FIG. 4, in Step S13, the calibration section 113 resets a non-execution period of calibration. That is, the calibration section 113 resets a time length of the non-execution period of calibration that is a period when the calibration is not performed to zero seconds, and thereafter restarts time count of the non-execution period of calibration.

Thereafter, the processing returns to Step S2, and Step S2 and the subsequent processing steps are performed.

In contrast, in Step S11, in a case where it is determined that the accuracy of the geomagnetic sensor 43 is low, the processing proceeds to Step S14.

Further, in Step S6, in a case where it is determined that the user is not moving, the processing proceeds to Step S14. This is a case where such a state is estimated to be an unknown state where neither a standing-still state nor a moving state of the user is determinable, and examples include a case where the user rotates the information processing apparatus 10. In such a case, the detection accuracy of the autonomous positioning with use of the IMU 15 will deteriorate.

In Step S14, the calibration section 113 determines whether or not the non-execution period of calibration is a predetermined time period or longer. In a case where it is determined that the non-execution period of calibration is less than the predetermined time period, that is, in a case where a period when the calibration is not performed has not yet reached the predetermined time period since the last calibration, the processing proceeds to Step S15.

It is to be noted that the predetermined time period is set at, for example, a time (for example, 100 seconds) ensuring that the detection accuracy of the autonomous positioning becomes equal to or more than a predetermined threshold even if no calibration is performed.

In Step S15, presentation of a normal detection result is performed similarly to the processing of Step S104 in FIG. 5 described above.

Thereafter, the processing returns to Step S2, and Step S2 and the subsequent processing steps are performed.

In contrast, in Step S14, in a case where it is determined that the non-execution period of calibration is the predetermined time period or longer, that is, in a case where the calibration has not been performed for the predetermined time period or longer since the last calibration, the processing proceeds to Step S16.

In Step S16, the output section 19 provides notification of non-completion of the calibration under control of the output controller 114. It is to be noted that any given method is adoptable for this notification. The user is notified of non-completion of the calibration by the use of, for example, visual information such as an image or light, auditory information such as a sound, tactile information such as vibration, or a combination of such information.

In Step S17, the output section 19 performs presentation of a detection result at the time of non-completion of the calibration under control of the output controller 114. For example, the output section 19 performs display of current position and heading of the user while providing notification that the calibration is uncompleted or that the reliability is low due to non-completion of the calibration. Alternatively, for example, the output section 19 stops updating of display of the position and the heading of the user, and provides notification that the position and the heading of the user are not updatable due to non-completion of the calibration.

Thereafter, the processing returns to Step S2, and Step S2 and the subsequent processing steps are performed.

As described above, the detection accuracy of a position and a heading of the user is improved by performing the calibration as appropriate. Further, the calibration is performed not only while the user is standing still, but also while the user is moving, resulting in further increase in the detection accuracy of the position and the heading of the user.

For example, FIG. 12 is a graph comparing detection results of movement trajectories of the user in cases where calibration is performed and no calibration is performed. In FIG. 12, a horizontal axis denotes an x-axis (a pitch axis), and a vertical axis denotes a y-axis (a roll axis). Further, FIG. 12 illustrates an example of detection results of movement trajectories of the user in a case of going around a rectangular course of about 60 meters in the x-axis direction and about 10 meters in the y-axis direction. A trajectory 241 indicated with a dotted line illustrates an example of a detection result of movement trajectory of the user in a case where no calibration is performed. A trajectory 242 indicated with a solid line illustrates an example of a detection result of movement trajectory of the user in a case where calibration is performed.

In a case where no calibration is performed, a detection result of a heading of the user becomes deviated gradually from an actual heading, resulting in a gradual increase in an error between the detected trajectory 241 and an actual movement trajectory of the user. In contrast, in a case where calibration is performed, any deviation between the detection result of the heading of the user and the actual heading is suppressed, resulting in suppression of the error between the detected trajectory 242 and the actual movement trajectory of the user.

Further, the user is notified of an execution status of calibration as information indicating the reliability of the detection result of the position and the heading of the user. In addition, the detection results of the position and the heading of the user are presented in different methods depending on the execution status of calibration, and thus the reliability of the detection result is presented.

It is to be noted that, as described above, because calibration is performed depending on an estimated state of the user, as a result the detection results of the position and the heading of the user are presented in different methods on the basis of the estimated state of the user, and the reliability of the detection result is presented. In other words, on the basis of the estimated state of the user, presentation (output) of the detection result of the position and the heading of the user, and the reliability of the detection result is controlled. More specifically, on the basis of whether or not the estimated state of the user is a state where calibration is executable, a time length of a period of the state where calibration is executable, a time length of a period of a state where no calibration is executable, or the like, presentation (output) of the detection result of the position and the heading of the user, and the reliability of the detection result is controlled.

This makes it possible to properly report, to the user, the reliability concerning the detection result of the position and the heading of the user that is obtained using an inertial sensor, and as a result allows the user to gain an easy and accurate understanding of the reliability of the presented position and the heading. Consequently, for example, in a case where detection errors of the position and the heading are great, it is possible for the user to take appropriate actions such as measures to refrain from acting on the information. This prevents a user trouble such as getting lost before it happens, or reduces user stress, for example.

Here, description is provided on an example of a method of presenting a detection result of a position and a heading of the user with reference to FIGS. 13A, 13B, 13C, 14A, 14B, and 14C.

Each of FIGS. 13A, 13B, 13C, 14A, 14B, and 14C schematically illustrate an example of a case where movement trajectories of the user are displayed on the output section 19 on the basis of the detection result of the position and the heading of the user.

It is to be noted that hereinafter description is provided on an example of a case where the user goes straight ahead as indicated with an arrow 261, and the user takes an unknown action in a region 262 along the way, which prevents calibration from being performed. Further, the arrow 261 and the region 262 are illustrated supplementarily, and are not actually displayed on the output section 19.

Each of FIGS. 13A, 13B, and 13C illustrate an example of a case where movement trajectories of the user to be detected by the autonomous positioning are displayed continuously even after calibration is prevented from being performed.

An example in FIG. 13A illustrate the reliability of a detection result displayed in two stages Specifically, in an interval in which a non-execution period of calibration is less than T1 seconds (for example, 100 seconds), and the reliability of a detection result (the detection accuracy) is high, a movement trajectory of the user is indicated with an arrow 271a. In contrast, in an interval in which the non-execution period of calibration is T1 seconds or longer, and the reliability of a detection result (the detection accuracy) is low, a movement trajectory of the user is indicated with an arrow 271b.

The arrow 271a and the arrow 271b are different in one or more of attributes such as color, density, thickness, and line type, and are visually distinguished. It is to be noted that FIG. 13A illustrates an example where the line type is changed between the arrow 271a and the arrow 271b This allows the user to clearly recognize a difference in the reliability of movement trajectories to be presented.

An example in FIG. 13B illustrates the reliability of a detection result displayed in three stages.

Specifically, in an interval in which the non-execution period of calibration is less than T1 seconds, and the reliability of a detection result (the detection accuracy) is high, a movement trajectory of the user is indicated with an arrow 281a. In contrast, in an interval in which the reliability of a detection result (the detection accuracy) during a period of time until T2 seconds (for example, 10 seconds) further elapse after the non-execution period of calibration reaches T1 seconds is moderate, a movement trajectory of the user is indicated with an arrow 281b. Further, in an interval in which the reliability of a detection result (the detection accuracy) during a period of time until T3 seconds (for example, 40 seconds) further elapse after the non-execution period of calibration reaches T1+T2 seconds is low, a movement trajectory of the user is indicated with an arrow 281c.

The arrow 281a to the arrow 281c are different in one or more of attributes such as color, density, thickness, and line type, and are visually distinguished. It is to be noted that FIG. 13B illustrates an example where the line type is changed between the arrow 281a to the arrow 281c.

This allows the user to recognize a difference in the reliability of movement trajectories to be presented in more exact detail.

It is to be noted that, after the non-execution period of calibration exceeds T1+T2+T3 seconds, updating of display of movement trajectories of the user is stopped until the next calibration is performed, for example.

An example in FIG. 13C illustrates the reliability of a detection result displayed in three stages using an error circle 292a to an error circle 292c.

Specifically, in an interval in which the non-execution period of calibration is less than T1 seconds, and the reliability of a detection result (the detection accuracy) is high, a movement trajectory of the user is indicated with an arrow 291a. Further, the error circle 292a indicating an error range is displayed on a tip of the arrow 291a. In contrast, in an interval in which the reliability of a detection result (the detection accuracy) during a period of time until T2 seconds further elapse after the non-execution period of calibration reaches T1 seconds is moderate, a movement trajectory of the user is indicated with an arrow 291b. Further, the error circle 292b indicating an error range is displayed on a tip of the arrow 291b. Further, in an interval in which the reliability of a detection result (the detection accuracy) during a period of time until T3 seconds further elapse after the non-execution period of calibration reaches T1+T2 seconds is low, a movement trajectory of the user is indicated with an arrow 291c. Further, the error circle 292c indicating an error range is displayed on a tip of the arrow 291c.

As the non-execution period of calibration becomes longer, and detection errors become greater, the error circle 292a to the error circle 292c become larger.

This allows the user to clearly recognize not only a difference in the reliability of movement trajectories to be presented, but also an error range.

It is to be noted that, after the non-execution period of calibration exceeds T1+T2+T3 seconds, updating of display of movement trajectories of the user is stopped until the next calibration is performed, for example.

Further, the arrow 291a to the arrow 291c may be visually distinguished, or may not be distinguished.

Each of FIGS. 14A, 14B, and 14C illustrates an example of a case of displaying movement trajectories of the user that are detected by another method (for example, Wi-Fi positioning) that is less accurate than the autonomous positioning after the non-execution period of calibration becomes T1 seconds or longer.

FIG. 14A illustrates an example where a movement trajectory detected by the autonomous positioning and a movement trajectory detected by the other method are displayed by distinguishing such movement trajectories from each other.

Specifically, a user movement trajectory detected by the autonomous positioning is indicated with an arrow 301a. Meanwhile, a user movement trajectory detected by the other method is indicated with an arrow 301b.

The arrow 301a and the arrow 301b are different in one or more of attributes such as color, density, thickness, and line type, and are visually distinguished. It is to be noted that FIG. 14A illustrates an example where the line type is changed between the arrow 301a and the arrow 301b.

This allows the user to clearly recognize differences in the positioning methods and the reliability of movement trajectories to be presented.

FIG. 14B illustrates an example where the reliability of the user movement trajectory detected by the other method is displayed in two stages.

Specifically, the user movement trajectory detected by the autonomous positioning is indicated with an arrow 311a. Meanwhile, in an interval until T2 seconds elapse from starting of display of the user movement trajectory detected by the other method, the user movement trajectory is indicated with an arrow 311b. Further, in an interval after T2 seconds elapse from starting of display of the user movement trajectory detected by the other method, the user movement trajectory is indicated with an arrow 311c.

The arrow 311a to the arrow 311c are different in one or more of attributes such as color, density, thickness, and line type, and are visually distinguished. It is to be noted that FIG. 14B illustrates an example where the line type is changed between the arrow 311a to the arrow 311c.

This allows the user to recognize differences in the positioning methods and the reliability of movement trajectories to be presented in more exact detail.

In an example in FIG. 14C, the reliability of detection results is indicated with an error circle 322a to an error circle 322e.

Specifically, the user movement trajectory detected by the autonomous positioning is indicated with an arrow 321a. Further, the error circle 322a indicating an error range is displayed on a tip of the arrow 321a. Meanwhile, the user movement trajectory detected by the other method is indicated with an arrow 321b to an arrow 321e. Further, the error circle 322b to the error circle 322e each indicating an error range are displayed on tips of the arrow 321b to the arrow 321e, respectively.

As a period of detection by the use of the other method becomes longer, and detection errors become greater, the error circle 322b to the error circle 322e become larger.

This allows the user to clearly recognize not only a difference in the positioning methods and the reliability of movement trajectories to be presented, but also an error range.

Next, examples of a method of providing notification of an execution status of calibration are described with reference to FIG. 15 to FIG. 17.

FIG. 15 illustrates an example of providing notification of an execution status of calibration through the use of an audio message.

Specifically, when a user 331 continues an unknown state where neither a standing-still state nor a moving state is determinable, and a state where no calibration is executable continues for a predetermined time period or longer, an audio message 332 providing notification that a detection result from the PDR is unavailable is outputted from the output section 19.

Next, when the user 331 starts walking, and calibration is resumed, an audio message 333 providing notification that calibration is ongoing is outputted from the output section 19.

Thereafter, when the user 331 continues walking, and calibration is completed, an audio message 334 providing notification that the detection result from the PDR is available is outputted from the output section 19.

FIG. 16 illustrates an example of providing notification of an execution status of calibration through the use of sound effects.

Specifically, when the user 331 continues an unknown state where neither a standing-still state nor a moving state is determinable, and a state where no calibration is executable continues for a predetermined time period or longer, beep sound indicating reduction in the reliability of a detection result of a position and a heading is outputted from a speaker 341 provided in the output section 19.

Next, when the user 331 starts walking, and calibration is resumed, a sound effect indicating that calibration is ongoing is outputted from the speaker 341. This sound effect is, for example, not so unpleasant as the above-described beep sound indicating reduction in the reliability, and sound volume is also small.

Thereafter, when the user 331 continues walking, and calibration is completed, output of such notification sound is stopped.

FIG. 17 illustrates an example of providing notification of an execution status of calibration through vibration of a smartphone 351 in a case where the information processing apparatus 10 includes the smartphone 351.

Specifically, when the user 331 continues an unknown state where neither a standing-still state nor a moving state is determinable, and a state where no calibration is executable continues for a predetermined time period or longer, the smartphone 351 vibrates significantly.

Next, when the user 331 starts walking, and calibration is resumed, vibration of the smartphone 351 is reduced.

Thereafter, when the user 331 continues walking, and calibration is completed, vibration of the smartphone 351 is stopped.

Any of the methods described above allows the user to easily recognize an execution status of calibration. Further, the user is allowed to recognize the reliability of a detection result of a position and a heading by recognizing the execution status of calibration. In addition, for example, it is hopeful that the user takes an action (for example, standing-still or walking) that enables calibration to be performed by recognizing the necessity of calibration.

2. Modification Examples

Hereinafter, description is provided on modification examples of the above-described embodiment of the present technology.

In the above descriptions, a case where a position and a heading of a user (a person) are detected by the use of the autonomous positioning is taken as an example; however, the present technology is also applicable to a case where a position and a heading of any of objects other than a person are detected using an inertial sensor. As such objects, for example, moving objects such as an animal, a robot, a vehicle, and an unmanned vehicle are assumed.

Further, in the present technology, information of an object to be acquired using the inertial sensor is not limited particularly. For example, other than the position and the heading as described above, the present technology is also applicable to a case where detection of, for example, velocity (including angular velocity), attitude, acceleration, and the like of an object is performed.

Additionally, in the present technology, a calibration method is not limited particularly, and for example, any method other than the above-described methods is also adoptable.

It is to be noted that a state of a user (an object) serving as a condition for execution of calibration is changed as appropriate depending on a calibration method and the like. For example, a condition of the user moving may be further limited, and calibration may be performed while the user is walking or running.

Moreover, the present technology is also applicable to a case where any inertial sensor other than a gyroscope sensor and an acceleration sensor is used. Further, the present technology is also applicable to a case where only one of the gyroscope sensor and the acceleration sensor is used.

Further, it is not always necessary to use the inertial sensor for estimation of a state of an object. For example, a state of an object may be estimated using an image photographed by a camera and the like.

Additionally, a method of presenting information of an object to be obtained by the use of the inertial sensor (for example, the above-described position and heading of the user), and reliability information indicating the reliability of the information of the object is not limited to the above-described examples, and it is possible to change such a method freely.

Moreover, at least one of the information of the object or the reliability information may be outputted to the outside using, for example, an API (Application Programming Interface). Expression (1) given below denotes an example of the API.

Int GetValidityPosition(void); (1)

A return value of the API in Expression (1) denotes the reliability of a detected position, and takes, for example, a value from 0 to 3. For example, in a case where use of a detected position is prohibited because calibration is not executable for a long time, the return value becomes 0. In a case where the reliability of a detected position is low, the return value becomes 1. In a case where the reliability of the detected position is moderate, the return value becomes 2. In a case where the reliability of the detected position is high, the return value becomes 3.

For example, through the use of the API, by providing notification of the reliability of a detected position of an object to an application program (hereinafter referred to as an APP) that utilizes the detected position, it is possible to take appropriate action on the APP side. For example, it is possible for the APP to stop the use of a detected position, use other data, or provide notification of reduction in the reliability. This allows for suppression of reduction in the APP performance and reduction in a user experience through the use of the APP, for example.

Further, for example, in a case where a non-execution period of calibration continues for a predetermined time period or longer, the information processing apparatus 10 may positively prompt the user to take an action (for example, standing-still or walking) that enables calibration to be performed. Such a modification example is applied to a use case that places greater importance on the accuracy of the positioning than the real-time performance or convenience of the positioning, for example. This modification example is applied to a use case that permits spending of user working costs like a case where a map is created, for example.

It is to be noted that, because a zero-point bias of the gyroscope sensor 42 is likely to vary with temperature, for example, when temperature varies by a certain amount or more, the information processing apparatus 10 may prompt the user to take an action that enables calibration to be performed.

Additionally, for example, typically a user attitude relative to the ground hardly varies while walking. Therefore, in a case where a detection result of the user attitude varies by a certain amount or more, the information processing apparatus 10 may assume that such variation is caused by variation in the zero-point bias of the gyroscope sensor 42, and may prompt the user to take an action that enables calibration to be performed.

3. Others

<Configuration Example of Computer>

A series of the above-described processing steps is executable using hardware, and is executable using software. In a case where a series of the processing steps is executed using software, programs that configure the software are installed on a computer. Here, examples of the computer include a computer built in dedicated hardware, a general-purpose personal computer, for example, that allows for execution of a variety of functions by installing various programs, and the like.

FIG. 18 is a block diagram illustrating a hardware configuration example of a computer that executes a series of the above-described processing steps using programs.

In a computer 500, a CPU (Central Processing Unit) 501, a ROM (Read-Only Memory) 502, and a RAM (Random Access Memory) 503 are coupled to one another through a bus 504.

An input/output interface 505 is further coupled to the bus 504. An input section 506, an output section 507, a recording section 508, a communication section 509, and a drive 510 are coupled to the input/output interface 505.

The input section 506 includes an input switch, a button, a microphone, an imaging device, and the like. The output section 507 includes a display, a speaker, and the like. The recording section 508 includes a hard disk, a non-volatile memory, and the like. The communication section 509 includes a network interface and the like. The drive 510 drives a removable recording medium 511 such as a magnetic disk, an optical disk, a magneto optical disk, or a semiconductor memory.

In the computer configured as described above, the CPU 501 loads, for example, programs recorded in the recording section 508 into the RAM 503 through the input/output interface 505 and the bus 504, and executes such programs. In such a manner, a series of the above-described processing steps is executed.

It is possible to provide programs to be executed by the computer (the CPU 501) by recording such programs in the removable recording medium 511 to be used as, for example, a package medium and the like. Further, it is possible to provide the programs through a wired or wireless transmission medium such as a local area network, the Internet, or digital satellite broadcasting.

In the computer, it is possible to install the programs on the recording section 508 through the input/output interface 505 by inserting the removable recording medium 511 into the drive 510. Further, it is possible to install the programs on the recording section 508 after receiving such programs at the communication section 509 through the wired or wireless transmission medium. In addition, it is possible to install the programs beforehand on the ROM 502 and the recording section 508.

It is to be noted that the programs to be executed by the computer may be programs that execute processing in a time-series manner in the order described in the present specification, or may be programs that execute processing in parallel or at the necessary timing such as when a call is made.

Further, in the present specification, a system means an aggregate of a plurality of components (apparatuses, modules (parts), and the like), and it does not matter whether or not all of the components are present in a same housing. Therefore, a plurality of apparatuses each of which is mounted in a separate housing, and is coupled over a network, and a single apparatus in which a plurality of modules is mounted in a single housing are each a system.

Additionally, the embodiment of the present technology is not limited to the above-described embodiment, and various modifications may be made without departing from the scope of the present technology.

For example, the present technology makes it possible to adopt a configuration of cloud computing in which a plurality of apparatuses shares a single function over a network to process such a function in cooperation.

Further, for each of the steps described in the above flowcharts, it is possible to perform such steps using a single apparatus; in addition to this, it is also possible to perform such steps in such a manner that a plurality of apparatuses shares such steps.

Additionally, in a case where a single step includes a plurality of processes, it is possible to perform the plurality of processes included in the single step using a single apparatus; in addition to this, it is also possible to perform such processes in such a manner that a plurality of apparatuses shares such processes.

<Examples of Combination of Configurations>

The present technology may also be configured as follows.

(1)

An information processing apparatus including:

a state estimation section that estimates a state of a predetermined object; and an output controller that controls, on a basis of an estimated state that is the estimated state of the object, output of reliability information indicating reliability of object information that is information of the object, the information of the object being available with use of an inertial sensor.

(2)

The information processing apparatus according to (1), in which the output controller controls the output of the reliability information on a basis of whether or not the estimated state is a state where calibration of the inertial sensor or the object information is executable.

(3)

The information processing apparatus according to (2), in which the output controller controls the output of the reliability information on a basis of a length of a period when the estimated state is a state where the calibration is executable, or a length of a period when the estimated state is a state where the calibration is not executable.

(4)

The information processing apparatus according to (2) or (3), in which in a case where the estimated state is a state where the calibration is not executable, the output controller controls output of the object information to output the reliability information indicating reduction in the reliability of the object information.

(5)

The information processing apparatus according to any one of (2) to (4), in which in a case where it is estimated that the object is standing still or moving, the state estimation section determines that the estimated state is a state where the calibration is executable.

(6)

The information processing apparatus according to any one of (2) to (5), in which the calibration includes calibration of a zero-point bias of the inertial sensor.

(7)

The information processing apparatus according to any one of (2) to (6), in which the reliability information includes an execution status of the calibration.

(8)

The information processing apparatus according to any one of (1) to (7), in which the output controller further controls output of the object information on a basis of the estimated state.

(9)

The information processing apparatus according to (8), in which the output controller controls the output of the object information and the reliability information to indicate the reliability of the object information by a method of presenting the object information.

(10)

The information processing apparatus according to (8) or (9), in which in a case where the estimated state continues to be a state where the calibration is not executable for a predetermined time period or longer, the output controller stops updating of the output of the object information.

(11)

The information processing apparatus according to any one of (1) to (10), in which the state estimation section estimates the state of the object on a basis of a signal value of the inertial sensor.

(12)

The information processing apparatus according to any one of (1) to (11), further including a calibration section that performs the calibration.

(13)

The information processing apparatus according to (12), in which in a case where it is estimated that the object is standing still or moving, the calibration section performs the calibration.

(14)

The information processing apparatus according to any one of (1) to (13), further including a detector that detects the object information on a basis of a signal value of the inertial sensor.

(15)

The information processing apparatus according to any one of (1) to (14), in which the object information includes at least one of position, heading, attitude, velocity, angular velocity, or acceleration of the object.

(16)

The information processing apparatus according to any one of (1) to (15), in which the inertial sensor includes at least one of a gyroscope sensor or an acceleration sensor.

(17)

An information processing method including:

a state estimation step of estimating a state of a predetermined object; and an output control step of controlling, on a basis of an estimated state that is the estimated state of the object, output of reliability information indicating reliability of object information that is information of the object, the information of the object being available with use of an inertial sensor.

(18)

A program causing a computer to execute processing including:

a state estimation step of estimating a state of a predetermined object; and an output control step of controlling, on a basis of an estimated state that is the estimated state of the object, output of reliability information indicating reliability of object information that is information of the object, the information of the object being available with use of an inertial sensor.

REFERENCE NUMERAL LIST

10 information processing apparatus
15 IMU
17 controller
19 output section
33 GNSS receiver
41 acceleration sensor 42 gyroscope sensor
61 CPU
101 information processor
111 detector
112 state estimation section
113 calibration section
114 output controller

The invention claimed is:

1. An information processing apparatus, comprising:
a state estimation section configured to:
  estimate a state of a specific object;
  determine the specific object is in the estimated state for one of a first time period or a second time period less than the first time period; and
  determine, based on the estimated state of the specific object, whether a calibration of an inertial sensor is executable; and
an output controller configured to:
  control, based on the determination that the calibration of the inertial sensor is executable, output of reliability information indicating a reliability of object information that is information of the specific object, wherein the information of the specific object is obtained based on an output of the inertial sensor;
  control, based on the determination that the specific object is in the estimated state for the first time period and the determination that the calibration of the inertial sensor is executable, output of a first notification indicating completion of the calibration of the inertial sensor; and
  control, based on the determination that the specific object is in the estimated state for the second time period less than the first time period and the determination that the calibration of the inertial sensor is executable, output of the object information and a second notification indicating that the calibration of the inertial sensor is ongoing.

2. The information processing apparatus according to claim 1, wherein the output controller is further configured to control the output of the reliability information based on a third time period of the estimated state, in a case the estimated state is a state in which the calibration is not executable.

3. The information processing apparatus according to claim 1, wherein in a case where the estimated state is a state where the calibration is not executable, the output controller is further configured to control the output of the object information to output the reliability information indicating a reduction in the reliability of the object information.

4. The information processing apparatus according to claim 1, wherein in a case where the estimated state of the specific object is one of standing still or moving, the state estimation section is further configured to determine that the estimated state is a state in which the calibration is executable.

5. The information processing apparatus according to claim 1, wherein the calibration comprises a calibration of a zero-point bias of the inertial sensor.

6. The information processing apparatus according to claim 1, wherein the output controller is further configured to control the output of the object information and the reliability information to indicate the reliability of the object information based on a method of presentation of the object information.

7. The information processing apparatus according to claim 1, wherein in a case where the estimated state continues to be a state where the calibration is not executable for a third time period or longer, the output controller is further configured to control stoppage of an update of the output of the object information.

8. The information processing apparatus according to claim 1, wherein the state estimation section is further configured to estimate the state of the specific object based on a signal value of the inertial sensor.

9. The information processing apparatus according to claim 1, further comprising a calibration section configured to execute the calibration.

10. The information processing apparatus according to claim 9, wherein in a case where the estimated state of the specific object is one of standing still or moving, the calibration section is further configured to execute the calibration.

11. The information processing apparatus according to claim 1, further comprising a detector configured to detect the object information based on a signal value of the inertial sensor.

12. The information processing apparatus according to claim 1, wherein the object information includes at least one of a position, a heading, an attitude, a velocity, an angular velocity, or an acceleration of the specific object.

13. The information processing apparatus according to claim 1, wherein the inertial sensor comprises at least one of a gyroscope sensor or an acceleration sensor.

14. An information processing method, comprising:
estimating a state of a specific object;
determining the specific object is in the estimated state for one of a first time period or a second time period less than the first time period;
determining, based on the estimated state of the specific object, whether a calibration of an inertial sensor is executable;
controlling, based on the determination that the calibration of the inertial sensor is executable, output of reliability information indicating a reliability of object information that is information of the specific object, wherein the information of the specific object is obtained based on an output of the inertial sensor;
controlling, based on the determination that the specific object is in the estimated state for the first time period and the determination that the calibration of the inertial sensor is executable, output of a first notification indicating completion of the calibration of the inertial sensor; and
controlling, based on the determination that the specific object is in the estimated state for the second time period less than the first time period and the determination that the calibration of the inertial sensor is executable, output of the object information and a second notification indicating that the calibration of the inertial sensor is ongoing.

15. A non-transitory computer-readable medium having stored thereon, computer-executable instructions which, when executed by a processor, cause the processor to execute operations, the operations comprising:
estimating a state of a specific object;
determining the specific object is in the estimated state for one of a first time period or a second time period less than the first time period;
determining, based on the estimated state of the specific object, whether a calibration of an inertial sensor is executable;
controlling, based on the determination that the calibration of the inertial sensor is executable, output of reliability information indicating a reliability of object information that is information of the specific object, wherein the information of the specific object is obtained based on an output of the inertial sensor;

controlling, based on the determination that the specific object is in the estimated state for the first time period and the determination that the calibration of the inertial sensor is executable, output of a first notification indicating completion of the calibration of the inertial sensor; and controlling, based on the determination that the specific object is in the estimated state for the second time period less than the first time period and the determination that the calibration of the inertial sensor is executable, output of the object information and a second notification indicating that the calibration of the inertial sensor is ongoing.

\* \* \* \* \*